United States Patent
Aylward et al.

(10) Patent No.: US 6,475,713 B1
(45) Date of Patent: Nov. 5, 2002

(54) IMAGING MEMBER WITH POLYESTER ADHESIVE BETWEEN POLYMER SHEETS

(75) Inventors: Peter T. Aylward, Hilton, NY (US); Robert P. Bourdelais, Pittsford, NY (US); Alphonse D. Camp, Rochester, NY (US); Thomas M. Smith, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/705,399

(22) Filed: Nov. 3, 2000

(51) Int. Cl.[7] .................. G03C 1/795; G03C 1/815; G03C 1/825; G03C 1/89; B32B 27/00
(52) U.S. Cl. .................. 430/502; 430/512; 430/507; 430/527; 430/531; 430/533; 430/534; 430/535; 430/536; 430/939; 428/423.1; 428/423.7; 428/424.2; 428/480; 428/482; 428/483; 428/515; 428/516; 428/520; 428/522; 428/523; 347/105
(58) Field of Search ................ 430/534, 535, 430/512, 536, 531, 533, 527, 502, 523, 212, 939, 507; 347/105; 428/423.1, 423.7, 424.2, 480, 782, 483, 500, 515, 516, 520, 522, 523

(56) References Cited

U.S. PATENT DOCUMENTS

| | | | | |
|---|---|---|---|---|
| 4,113,493 A | * | 9/1978 | Sandhu et al. | 430/212 |
| 4,377,616 A | | 3/1983 | Ashcraft et al. | 428/213 |
| 4,632,869 A | | 12/1986 | Park et al. | 428/315.5 |
| 4,758,462 A | | 7/1988 | Park et al. | 428/213 |
| 4,992,353 A | * | 2/1991 | Rodakis et al. | 430/212 |
| 5,288,570 A | * | 2/1994 | von Trebra et al. | 430/510 |
| 5,846,900 A | * | 12/1998 | Reiter et al. | 503/227 |
| 5,888,714 A | | 3/1999 | Bourdelais et al. | 430/536 |
| 6,030,756 A | | 2/2000 | Bourdelais et al. | 430/536 |
| 6,045,965 A | | 4/2000 | Cournoyer et al. | 430/536 |
| 6,270,950 B1 | * | 8/2001 | Bourdelais et al. | 430/534 |

* cited by examiner

Primary Examiner—Richard L. Schilling
(74) Attorney, Agent, or Firm—Paul A. Leipold

(57) ABSTRACT

The invention relates to an imaging member comprising at least two polymer sheets joined by solvent based thermoplastic adhesive applied to at least one said at least two polymer sheets between 15 and 50° C.

52 Claims, No Drawings

IMAGING MEMBER WITH POLYESTER ADHESIVE BETWEEN POLYMER SHEETS

FIELD OF THE INVENTION

This invention relates to photographic materials. In a preferred form it relates to base materials for photographic reflection and transmission display.

BACKGROUND OF THE INVENTION

It is known in the art that photographic display materials are utilized for advertising, as well as decorative displays of photographic images. Since these display materials are used in advertising, the image quality of the display material is critical in expressing the quality message of the product or service being advertised. Further, a photographic display image needs to be high impact, as it attempts to draw consumer attention to the display material and the desired message being conveyed. Typical applications for display material include product and service advertising in public places such as airports, buses and sports stadiums, movie posters, and fine art photography. The desired attributes of a quality, high impact photographic display material are a slight blue density minimum, durability, sharpness, and flatness. Cost is also important, as display materials tend to be expensive compared with alternative display material technology such as lithographic images on paper. For display materials, traditional color paper is undesirable, as it suffers from a lack of durability for the handling, photo processing, and display of large format images.

Prior art photographic display materials historically have been classified as either reflection or transmission. Reflection display material typically is highly pigmented image supports with a light sensitive silver halide coating applied. Reflection display materials are typically used in commercial applications where an image is used to convey an idea or message. An application example of a reflection display material is product advertisement in a public area. Prior art reflection display materials have been optimized to provide a pleasing image using reflective light. Transmission display materials are used in commercial imaging applications and are typically backlit with a light source. Transmission display materials are typically a clear support with a light sensitive silver halide and an incorporated diffuser (to hide the "show through" of the lamps used to provide viewing illumination) or a substantially transparent support coated with a light sensitive silver halide emulsion which requires a diffusing screen placed behind the material as a means to obscure the "show through" of the lamps used to provide illumination to the media. Prior art transmission display materials have been optimized to provide a pleasing image when the image is backlit with a variety of light sources. Because prior art reflection and transmission products have been optimized to be either a reflection display image or a transmission display image, two separate product designs must exist in manufacturing, and two inventories of display materials must be maintained at the commercial printer. Further, when the quality of the backlighting for transmission display material is reduced when, for example, a backlight bums out or the output of the backlight decreases with the age, the transmission image will appear dark and reduce the commercial value of the image. It would be desirable if an image support could function both as a reflection and transmission display material. Prior art transmission display materials use a high coverage of light sensitive silver halide emulsion to increase the density of the image compared to photographic reflection print materials. While increasing the coverage does increase the density of the image in transmission space, the time to image development is also increased as the coverage increases. Typically, a high-density transmission display material has a developer time of 110 seconds compared to a developer time of 45 seconds or less for photographic print materials. Prior art high-density transmission display materials, when processed, reduce the productivity of the development.lab. Further, coating a high coverage of emulsion requires additional drying of the emulsion in manufacturing, which reduces the productivity of emulsion coating machines. It would be desirable if a transmission display material was high in density and had a developer time less than 50 seconds. In U.S. Pat. No. 6,030,756 it has been proposed to form a Day/Night photographic display material with a biaxially orineted polyolefin sheet. Bourdelais et al disclose examples for the formation of a day/night display material by extrusion laminating a biaxially oriented sheet to a clear polyester sheet using a melt extrudable blend of ethylene plastomer and polyethylene. While this provides a good means of bonding the two sheets together, there remains a need for improvements.

Prior art reflection photographic materials with a polyester base use a $TiO_2$ pigmented polyester base onto which light sensitive silver halide emulsions are coated. It has been proposed in WO 94/04961 to use an opaque polyester containing 10% to 25% $TiO_2$ for a photographic support. The $TiO_2$ in the polyester gives the reflection display materials an undesirable opalescent appearance. The $TiO_2$ pigmented polyester also is expensive because the $TiO_2$ must be dispersed into the entire thickness, typically from 100 to 180 micrometers. The $TiO_2$ used in this fashion also gives the polyester support a slight yellow tint, which is undesirable for a photographic display material. For use as a photographic display material, the polyester support containing $TiO_2$ must be tinted blue to offset the yellow tint of the polyester causing a loss in desirable whiteness and adding cost to the display material.

Prior art photographic display material uses polyester as a base for the support. Typically the polyester support is from 150 to 250 micrometers thick to provide the required stiffness. A thinner base material would be lower in cost and allow for roll handling efficiency, as the rolls would weigh less and be smaller in diameter. It would be desirable to use a base material that had the required stiffness but was thinner to reduce cost and improve roll-handling efficiency. Duplitized display materials possessing both reflection properties, as well as sufficient dye formed on the backside as a means to present pleasing densities when backlit, would be highly desired for display applications. The media would present eye-catching and aesthetically pleasing reflection images, as well as being able to provide pleasing images of sufficient dye densities during nighttime or in low ambient light levels when illuminated from the backside. In addition, the dual property of the formed image (both reflection and transmissive) would allow for pleasing images in outdoor applications or those cases subject to non-controllable high ambient reflection surface lighting (man-made or natural) by the property of the formed front side image. The face side image formed and backed by the semi-reflective property of the substrate and illuminated by front surface lighting would not appear "washed out" as conventional transmission only display media would. However, the same attributes that provide a multi purpose media for viewing have been found to present some difficulties in forming said images. The inability to predict the future with regard to printer design and expected wear of existing printers can cause serious deficiencies in correct latent image formation. Specifically, a backside light sensitive layer, when exposed against a backing platen of non-uniform reflectivity (due to either wear or design) can adversely affect both the quality of the formed backside latent image, as well as the subsequently processed image resulting in localized non-uniform dye density. The obvious use of an antihalation layer below and adjacent to the bottommost light sensitive layer in the backside structure would clearly resolve the problem of non-uniform reflectivity of any backing apparatus in the printer but presents its own set of issues. This inclusion of an antihalation layer will solve the problem of backlight scatter by non-uniform reflectivity of media backing in the printer but will also remove the benefit of any secondary exposure of the backside light sensitive layers.

Both a "primary first pass" and a "secondary exposure" of the backside emulsion occur when exposed from the front side. This is caused by the designed back scatter of the media and compensates for the initial loss of the imaging radiation caused by imaging through the front side of the media and passing through both front side absorber dyes, as well as the turbid support prior to reaching the backside light sensitive layers. In this fashion, a duplicate image of the front side image of sufficient sharpness and sufficient dye density is formed on the backside. This allows for both proper image registration (low to no flare of the backside image) as well as sufficient dye density to survive backlighting. In the presence of an antihalation layer on the backside necessitated by uncontrolled back scatter in the printer, the practical result will be a very low density formation of the backside image, and any attempt to increase the front side exposure to improve the backside density will result in overexposure of the face side light sensitive layers, thus degrading the front side image. This obstacle was solved by the invention whereby a tone enhancing layer was added to the backside adjacent to the bottommost light sensitive layer to provide a tunable "secondary exposure" capability, while also allowing for the application of an antihalation layer to defeat any non-uniform reflectivity resulting from any backing platen or stray back light in the printer. The use of this tone enhancing layer also allows for even further improvement of the backside image sharpness, as well as an overall and pleasing increase in transmission maximum density, while not adversely affecting the quality of the face side image.

In has been proposed in U.S. Pat. No. 6,030,756 that a biaxially oriented polyolefin sheet be extrusion laminated to a sheet of polyester base to form a digital photographic display. While the material that is formed provides a superior reflective and transmissive display material, the means of adhesively joining the two sheets can be improved. Obtaining optimal adhesion and improved product handling performance is desirable. The biaxially oriented polyolefin sheet contains a voided layer that can collapse under excessive compression forces. Such compression forces can occur when handling large format display materials. These are often referred to as handling kinks. There remains a need for improved bonding performance, slit edge quality, as well as improved handling performance. The display business is also very competitive and is always looking to minimize cost. The use of melt extrudable materials, while relatively inexpensive, are limited by how thin the layer can be coated. There remains a need to provide a means of joining two polymer sheets together using a very thin inexpensive layer.

PROBLEM TO BE SOLVED BY THE INVENTION

There is a continuing need for an improved product that will present a sharp reflective image when viewed directly and also provide a sharp bright image when backlit. In addition, there remains a need to provide display material that is light in weight and is also resistant to cracking and handling kinks and a core set problem when wound and stored in tubes.

SUMMARY OF THE INVENTION

It is an object of the invention to overcome disadvantages of display materials.

It is another object to provide a superior, lower cost, and stronger display material.

It is a further object to minimize handling marks.

It is an additional object to provide a display material light in weight.

A further objective to provide a display material that has improved bonding between the biaxially oriented sheet and the polyester sheet, These and other objects of the invention are accomplished by an imaging member comprising at least two polymer sheets joined by solvent based thermoplastic adhesive applied to at least one said at least two polymer sheets between 15 and 50° C.

ADVANTAGEOUS EFFECT OF THE INVENTION

The invention provides a material that will when imaged and developed results in a bright sharp reflective image, when viewed in ambient front surface lighting conditions as well as allowing for a pleasing image of sufficient dye density when illuminated with a transmission light source. In a preferred form the invention provides a product that is lighter in weight, has improved durability to resist handling damage, is easier to store and has enhanced bonding between the biaxially oriented sheet and the polyester sheet.

DETAILED DESCRIPTION OF THE INVENTION

The invention has numerous advantages over prior art materials. The invention provides a stronger material as the biaxially oriented polyolefin sheet provides flexural rigidity. The material as it contains in its preferred form silver halide imaging layers on both sides of a polymer sheet may be imaged by a collimated beam exposure device in a single exposure. As there are two relatively thin layers of silver halide image materials, the developing of the invention element may be carried out rapidly as the penetration of the developing solution is rapid through the thin layers of imaging material. The material of the invention is low in cost as a thinner layer of material may be used to adhesively adhere the biaxially oriented sheet to the polyester sheet.

The terms as used herein, "top", "upper", and "face" relate to the side that is facing the exposure source. The terms "bottom", "lower", and "back" mean the side that is farther from the exposure source. The term as used herein, "transparent" means the ability to pass radiation without significant deviation or absorption. For this invention, "transparent" material is defined as a material that has a spectral transmission greater than 90%. For a photographic element, spectral transmission is the ratio of the transmitted power to the incident power and is expressed as a percentage as follows: $T_{RGB}=10^{-D}*100$ where D is the average of the red, green, and blue Status A transmission density response of the processed minimum density of the photographic element as measured by an X-Rite model 310 (or comparable) photographic transmission densitometer. The term as used herein, "duplitized" means light sensitive silver halide coating on the top side and the bottom side of the imaging support.

The layers of the biaxially oriented polyolefin sheet of this invention have levels of voiding, $TiO_2$ and colorants adjusted to provide optimum transmission and reflection properties. The biaxially oriented polyolefin sheet is laminated to a transparent polymer base for stiffness, for efficient image processing, as well as product handling and display. An important aspect of this invention is the imaging support which is coated with a light sensitive silver halide emulsion on the top side and the bottom side, this duplitized silver halide coating combined with the optical properties of the biaxially oriented sheet and the intelligent placement of a $TiO_2$ layer and antihalation layer in the backside photosensitive layer provides an acceptable photographic display material that can be used in both reflection and transmission that has superior secondary image forming capability, while maintaining an antihalition layer. The "dual" display material of this invention has significant commercial value in that prior art photographic display materials function as either a reflection display or a transmission display, as well as possessing the ability to work in a variety of printers having shiny or differential reflective properties of any backing platen employed. It has been found that the duplitized emulsion coverage should be in a range that is greater than 75% and less than 175% of the of typically emulsion coverage for reflection paper, most preferably in the range of 100% to 150%.

Any suitable biaxially oriented polyolefin sheet may be utilized as part of the laminated base of the invention. Microvoided composite biaxially oriented sheets are preferred because the voids provide opacity without the use of $TiO_2$. Microvoided composite oriented sheets are conveniently manufactured by co-extrusion of the core and surface layers, followed by biaxial orientation, whereby voids are formed around void-initiating material contained in the core layer. Such composite sheets are disclosed in, for example, U.S. Pat. Nos. 4,377,616; 4,758,462; and 4,632,869.

The core of the preferred composite sheet should be from 15 to 95% of the total thickness of the sheet, preferably from 30 to 85% of the total thickness. The nonvoided skin(s) should thus be from 5 to 85% of the sheet, preferably from 15 to 70% of the thickness. The density (specific gravity) of the composite sheet, expressed in terms:of "percent of solid density" is calculated as follows:

$$\frac{\text{Composite Sheet Density}}{\text{Polymer Density}} \times 100 = \% \text{ of Solid Density}$$

This value should be between 45% and 100%, preferably between 67% and 100%. As the percent solid density becomes less than 67%, the composite sheet becomes less manufacturable due to a drop in tensile strength and it becomes more susceptible to physical damage.

The total thickness of the composite biaxially oriented sheet can range from 12 to 100 micrometers, preferably from 20 to 70 micrometers. Below 20 micrometers, the microvoided sheets may not be thick enough to minimize any inherent non-planarity in the support and would be more difficult to manufacture. At thickness higher than 70 micrometers, little improvement in either surface smoothness or mechanical properties are seen, and so there is little justification for the further increase in cost for extra materials.

"Void" is used herein to mean devoid of added solid and liquid matter, although it is likely the "voids" contain gas.

The void-initiating particles which remain in the finished packaging sheet core should be from 0.1 to 10 micrometers in diameter, preferably round in shape, to produce voids of the desired shape and size. The size of the void is also dependent on the degree of orientation in the machine and transverse directions. Ideally, the void would assume a shape, which is defined by two opposed, and edge contacting concave disks. In other words, the voids tend to have a lens-like or biconvex shape. The voids are oriented so that the two major dimensions are aligned with the machine and transverse directions of the sheet. The Z-direction axis is a minor dimension and is roughly the size of the cross diameter of the voiding particle. The voids generally tend to be closed cells, and thus there is virtually no path open from one side of the voided-core to the other side through which gas or liquid can traverse.

The void-initiating material may be selected from a variety of materials, and should be present in an amount of about 5–50% by weight based on the weight of the core matrix polymer. Preferably, the void-initiating material comprises a polymeric material. When a polymeric material is used, it may be a polymer that can be melt-mixed with the polymer from which the core matrix is made and be able to form dispersed spherical particles as the suspension is cooled down. Examples of this would include nylon dispersed in polypropylene, polybutylene terephthalate in polypropylene, or polypropylene dispersed in polyethylene terephthalate. If the polymer is preshaped and blended into the matrix polymer, the important characteristic is the size and shape of the particles. Spheres are preferred and they can be hollow or solid. These spheres may be made from cross-linked polymers which are members selected from the group consisting of an alkenyl aromatic compound having the general formula Ar—C(R)=$CH_2$, wherein Ar represents an aromatic hydrocarbon radical, or an aromatic halohydrocarbon radical of the benzene series and R is hydrogen or the methyl radical; acrylate-type monomers include monomers of the formula $CH_2$=C(R')-C(O)(OR) wherein R is selected from the group consisting of hydrogen and an alkyl radical containing from about 1 to 12 carbon atoms and R is selected from the group consisting of hydrogen and methyl; copolymers of vinyl chloride and vinylidene chloride, acrylonitrile and vinyl chloride, vinyl bromide, vinyl esters having formula $CH_2$=CH(O)COR, wherein R is an alkyl radical containing from 2 to 18 carbon atoms; acrylic acid, methacrylic acid, itaconic acid, citraconic acid, maleic acid, fumaric acid, oleic acid, vinylbenzoic acid; the synthetic polyester resins which are prepared by reacting terephthalic acid and dialkyl terephthalics or ester-forming derivatives thereof, with a glycol of the series $HO(CH_2)_n OH$ wherein n is a whole number within the range of 2–10 and having reactive olefinic linkages within the polymer molecule, the above described polyesters which include copolymerized therein up to 20 percent by weight of a second acid or ester thereof having reactive olefinic unsaturation and mixtures thereof, and a cross-linking agent selected from the group consisting of divinylbenzene, diethylene glycol dimethacrylate, diallyl fumarate, diallyl phthalate, and mixtures thereof.

Examples of typical monomers for making the cross-linked polymer include styrene, butyl acrylate, acrylamide, acrylonitrile, methyl methacrylate, ethylene glycol dimethacrylate, vinyl pyridine, vinyl acetate, methyl acrylate, vinylbenzyl chloride, vinylidene chloride, acrylic acid, divinylbenzene, acrylamidomethylpropane sulfonic acid, vinyl toluene, etc. Preferably, the cross-linked polymer is polystyrene or poly(methyl methacrylate). Most preferably, it is polystyrene and the cross-linking agent is divinylbenzene.

Processes well known in the art yield non-uniformly sized particles, characterized by broad particle size distributions. The resulting beads can be classified by screening the beads spanning the range of the original distribution of sizes. Other processes such as suspension polymerization, limited coalescence, directly yield very uniformly sized particles.

The void-initiating materials may be coated with agents to facilitate voiding. Suitable agents or lubricants include colloidal silica, colloidal alumina, and metal oxides such as tin oxide and aluminum oxide. The preferred agents are colloidal silica and alumina, most preferably, silica. The cross-linked polymer having a coating of an agent may be prepared by procedures well known in the art. For example, conventional suspension polymerization processes wherein the agent is added to the suspension is preferred. As the agent, colloidal silica is preferred.

The void-initiating particles can also be inorganic spheres, including solid or hollow glass spheres, metal or ceramic beads or inorganic particles such as clay, talc, barium sulfate, calcium carbonate. The important thing is that the material does not chemically react with the core matrix polymer to cause one or more of the following problems: (a) alteration of the crystallization kinetics of the matrix polymer, making it difficult to orient, (b) destruction of the core matrix polymer, (c) destruction of the void-initiating particles, (d) adhesion of the void-initiating particles to the matrix polymer, or (e) generation of undesirable reaction products, such as toxic or high color moieties. The void-initiating material should not be photographically active or degrade the performance of the photographic element in which the biaxially oriented polyolefin film is utilized.

For the biaxially oriented sheets on the side toward the emulsion, suitable classes of thermoplastic polymers for the biaxially oriented sheet and the core matrix-polymer of the preferred composite sheet comprise polyolefins. Suitable polyolefins include polypropylene, polyethylene, polymethylpentene, polystyrene, polybutylene and mixtures thereof. Polyolefin copolymers, including copolymers of propylene and ethylene such as hexene, butene, and octene are also useful. Polypropylene is preferred, as it is low in cost and has desirable strength properties.

The nonvoided skin layers of the composite sheet can be made of the same polymeric materials as listed above for the core matrix. The composite sheet can be made with skin(s) of the same polymeric material as the core matrix, or it can be made with skin(s) of different polymeric composition than the core matrix. For compatibility, an auxiliary layer can be used to promote adhesion of the skin layer to the core.

The total thickness of the top most skin layer or exposed surface layer should be between 0.20 micrometers and 1.5 micrometers, preferably between 0.5 and 1.0 micrometers. Below 0.5 micrometers any inherent non-planarity in the coextruded skin layer may result in unacceptable color variation. At skin thickness greater than 1.0 micrometers, there is a reduction in the photographic optical properties such as image resolution. At thickness greater that 1.0 micrometers there is also a greater material volume to filter for contamination such as clumps, poor color pigment dispersion, or contamination. Low density polyethylene with a density of 0.88 to 0.94 g/cc is the preferred material for the top skin because current emulsion formulation adhere well to low density polyethylene compared to other materials such as polypropylene and high density polyethylene.

Addenda may be added to the topmost skin layer to change the color of the imaging element. For photographic use, a white base with a slight bluish tinge is preferred. The addition of the slight bluish tinge may be accomplished by any process which is known in the art including the machine blending of color concentrate prior to extrusion and the melt extrusion of blue colorants that have been pre-blended at the desired blend ratio. Colored pigments that can resist extrusion temperatures greater than 320° C. are preferred, as temperatures greater than 320° C. are necessary for coextrusion of the skin layer. Blue colorants used in this invention may be any colorant that does not have an adverse impact on the imaging element. Preferred blue colorants include phthalocyanine blue pigments, cromophtal blue pigments, Irgazin blue pigments, Irgalite organic blue pigments, and pigment Blue 60.

One detail of this invention is the finding that a very thin coating (0.2 to 1.5 micrometers) on the surface immediately below the emulsion layer can be made by coextrusion and subsequent stretching in the width and length direction. It has been found that this layer is, by nature, extremely accurate in thickness and can be used to provide all the color corrections which are usually distributed throughout the thickness of the sheet between the emulsion and the paper base. This topmost layer is so efficient that the total colorants needed to provide a correction are less than one-half the amount needed if the colorants are dispersed throughout thickness. Colorants are often the cause of spot defects due to clumps and poor dispersions. Spot defects, which decrease the commercial value of images, are improved with this invention because less colorant is used and high quality filtration to clean up the colored layer is much more feasible since the total volume of polymer with colorant is only typically 2 to 10 percent of the total polymer between the base paper and the photosensitive layer.

While the addition of $TiO_2$ in the thin skin layer of this invention does not significantly contribute to the optical performance of the sheet it can cause numerous manufacturing problems such as extrusion die lines and spots. A skin layer substantially free of $TiO_2$ is preferred. $TiO_2$ added to a layer between 0.20 and 1.5 micrometers does not substantially improve the optical properties of the support, will add cost to the design, and will cause objectionable pigments lines in the extrusion process.

Addenda may be added to the biaxially oriented sheet of this invention so that when the biaxially oriented sheet is viewed from a surface, the imaging element emits light in the visible spectrum when exposed to ultraviolet radiation. Emission of light in the visible spectrum allows for the support to have a desired background color in the presence of ultraviolet energy. This is particularly useful when images are viewed outside as sunlight contains ultraviolet energy and may be used to optimize image quality for consumer and commercial applications.

Addenda known in the art to emit visible light in the blue spectrum are preferred. Consumers generally prefer a slight blue tint to white defined as a negative b* compared to a white, white defined as a b* within one b* unit of zero. b* is the measure of yellow/blue in CIE space. A positive b* indicates yellow while a negative b* indicates blue. The addition of addenda that emits in the blue spectrum allows for tinting the support without the addition of colorants which would decrease the whiteness of the image. The preferred emission is between 1 and 5 delta b* units. Delta b* is defined as the reflection b* difference measured when a sample is illuminated by an ultraviolet light source and a light source without any significant ultraviolet energy. Delta b* is the preferred measure to determine the net effect of adding an optical brightener to the top biaxially oriented sheet of this invention. Emissions less than 1 b* unit cannot be noticed by most customers; therefore, is it not cost effective to add optical brightener to the biaxially oriented sheet. An emission greater that 5 b* units would interfere with the color balance of the prints making the whites appear too blue for most consumers.

The preferred addendum of this invention is an optical brightener. An optical brightener is colorless, fluorescent, organic compound that absorbs ultraviolet light and emits it as visible blue light. Examples include, but are not limited to, derivatives of 4,4'-diaminostilbene-2,2'-disulfonic acid, coumarin derivatives such as 4-methyl-7-diethylaminocoumarin, 1,4-bis (o-cyanostyryl)benzol, and 2-amino-4-methyl phenol.

The optical brightener may be added to any layer in the multilayer coextruded biaxially oriented polyolefin sheet. The preferred location is adjacent to or in the exposed surface layer of said sheet. This allows for the efficient concentration of optical brightener which results in less optical brightener being used when compared to traditional photographic supports. When the desired weight % loading of the optical brightener begins to approach the concentration at which the optical brightener migrates to the surface of the support forming crystals in the imaging layer, the addition of optical brightener into the layer adjacent to the exposed layer is preferred. When optical brightener migration is a concern as with light sensitive silver halide imaging systems, the preferred exposed layer is comprised polyethylene. In this case, the migration from the layer adjacent to the exposed layer is significantly reduced, allowing for much higher optical brightener levels to be used to optimize image quality. Locating the optical brightener in the layer adjacent to the exposed layer allows for a less expensive optical brightener to be used as the exposed layer, which is substantially free of optical brightener, prevents significant migration of the optical brightener. Another preferred method to reduce unwanted optical brightener migration is to use polypropylene for the layer adjacent to the exposed surface. Since optical brightener is more soluble in polypropylene than polyethylene, the optical brightener is less likely to migrate from polypropylene.

A biaxially oriented sheet of this invention which has a microvoided core is preferred. The microvoided core adds opacity and whiteness to the imaging support further improving imaging quality. Combining the image quality advantages of a microvoided core with a material which absorbs ultraviolet energy and emits light in the visible spectrum allows for the unique optimization of image quality, as the image support can have a tint when exposed to ultraviolet energy, yet retain excellent whiteness when the image is viewed using lighting that does not contain significant amounts of ultraviolet energy such as indoor lighting. The preferred number of voids in the vertical direction at substantially every point is greater than six. The number of voids in the vertical direction is the number of polymer/gas interfaces present in the voided layer. The voided layer functions as an opaque layer because of the index of refraction changes between polymer/gas interfaces. Greater than six voids is preferred because at 4 voids or less, little improvement in the opacity of the film is observed and, thus, does not justify the added expense to void the biaxially oriented sheet of this invention.

The microvoided core of the biaxially oriented sheet of this invention also increases the opacity of the image element without the use of $TiO_2$ or other white pigments. During the printing process in which a latent image is formed in the image layers, simultaneous exposure of imaging layers of the top and bottom sides is preferred to reduce development time and increase image density. $TiO_2$ in the support structure will tend to scatter the exposure light causing unwanted exposure. The voided layer while providing opacity also allows for the transmission of light without unwanted exposure.

The biaxially oriented sheet may also contain pigments which are known to improve the photographic responses such as whiteness or sharpness. Titanium dioxide is used in this invention to improve image sharpness. The $TiO_2$ used may be either anatase or rutile type. In the case of optical properties, rutile is the preferred because of the unique particle size and geometry. Further, both anatase and rutile $TiO_2$ may be blended to improve both whiteness and sharpness. Examples of $TiO_2$ that are acceptable for a photographic system are DuPont Chemical Co. R101 rutile $TiO_2$ and DuPont Chemical Co. R104 rutile $TiO_2$. Other pigments to improve photographic responses may also be used in this invention such as titanium dioxide, barium sulfate, clay, or calcium carbonate.

The preferred amount of $TiO_2$ added to the biaxially oriented sheet of this invention is between 3 and 18% by weight. Below 2% $TiO_2$, the required reflection density of the biaxially oriented sheet is difficult to obtain. Above 20%, the desired transmission characteristics are difficult to obtain. Further, above 20% $TiO_2$, manufacturing efficiency declines because of melt extrusion problems associated with the use of $TiO_2$ such as plate out on the screw, die manifold and die lips.

For a display material to function both as a reflection display and a backlit transmission display material, the support must function as an acceptable reflective support and allow enough light to be transmitted so that support can also function as a transmission material. Further, transmission and reflection properties must be managed so that the photographic display material can be simultaneously exposed on the topside and bottom sides. The preferred exposure method is from the topside of the imaging element. Simultaneous exposure is performed by light exposing the topside light sensitive coating, traveling through the support structure and exposing the bottom side light sensitive coating.

Due to the nature of transmission viewing materials with incorporated diffusers, (the fact that the materials are captured or suspended in a viewing box which contains an illumination source and an air interface between the illumination source and the display material) a more transmissive display material can be tolerated and still appear sufficiently opaque in the reflection mode while allowing for maximum transmission when used in a backlit mode. This transmissiveness also enables the image formation step for the duplitized coating, as the increased transmissiveness allows for more of the imaging light to reach the backside light sensitive silver halide emulsion coating.

The preferred spectral transmission of the biaxially oriented polyolefin sheet that may used in this invention is less than 50%. Spectral transmission is the amount of light energy that is transmitted through a material. For a photographic element, spectral transmission is the ratio of the transmitted power to the incident power and is expressed as a percentage as follows: $T_{RGB}=10^{-D}*100$ where D is the average of the red, green, and blue Status A transmission density response of a processed minimum density measured by an X-Rite model 310 (or comparable) photographic transmission densitometer. The higher the transmission, the less opaque the material. For a reflection display material, the quality of the image is related to the amount of light reflected from the image to the observer's eye. A reflective image with a high amount of spectral transmission does not allow sufficient light to reach the observer's eye, causing a perceptual loss in image quality. A reflective image with a spectral transmission of greater than 55% is unacceptable for a reflection display material, as the quality of the image cannot match prior art reflection display materials.

The coextrusion, quenching, orienting, and heat setting of these composite sheets may be effected by any process which is known in the art for producing oriented sheet, such as by a flat sheet process or a bubble or tubular process. The flat sheet process involves extruding the blend through a slit die and rapidly quenching the extruded web upon a chilled casting drum so that the core matrix polymer component of the sheet and the skin components(s) are quenched below their glass solidification temperature. The quenched sheet is then biaxially oriented by stretching in mutually perpendicular directions at a temperature above the glass transition temperature, below the melting temperature of the matrix polymers. The sheet may be stretched in one direction and then in a second direction or may be simultaneously stretched in both directions. A stretching ratio, defined as the final length divided by the original length for sum of the machine and cross directions, of at least 10 to 1 is preferred. After the sheet has been stretched, it is heat set by heating to a temperature sufficient to crystallize or anneal the polymers while restraining to some degree the sheet against retraction in both directions of stretching.

The composite sheet, while described as having preferably at least three layers of a core and a skin layer on each side, may also be provided with additional layers that may serve to change the properties of the biaxially oriented sheet. Biaxially oriented sheets could be formed with surface layers that would provide an improved adhesion or look to the support and photographic element. The biaxially oriented extrusion could be carried out with as many as 10 layers if desired to achieve some particular desired property.

These composite sheets may be coated or treated after the coextrusion and orienting process or between casting and full orientation with any number of coatings which may be used to improve the properties of the sheets including printability, to provide a vapor barrier, to make them heat sealable, or to improve the adhesion to the support or to the photosensitive layers. Examples of this would be acrylic coatings for printability, coating polyvinylidene chloride for heat seal properties. Further examples include flame, plasma or corona discharge treatment to improve printability or adhesion.

By having at least one nonvoided skin on the microvoided core, the tensile strength of the sheet is increased and makes it more manufacturable. It allows the sheets to be made at wider widths and higher draw ratios than when sheets are made with all layers voided. Coextruding the layers further simplifies the manufacturing process.

The structure of a preferred biaxially oriented sheet where the exposed surface layer is adjacent to the imaging layer is as follows:

Polyethylene skin with blue pigments
Polypropylene with $TiO_2$ and optical brightener
Polypropylene microvoided layer
Polypropylene bottom skin layer The support to which the microvoided composite sheets and biaxially oriented sheets are laminated for the laminated support of the photosensitive silver halide layer may be any material with the desired transmission and stiffness properties. Photographic elements of the invention can be prepared on any suitable transparent photographic quality support including sheets of various kinds of synthetic paper such as polystyrene, ceramics, synthetic high molecular weight sheet materials such as polyalkyl acrylates or methacrylates, polystyrene, polyamides such as nylon, sheets of semi-synthetic high molecular weight materials such as cellulose nitrate, cellulose acetate butyrate, and the like; homo- and copolymers of vinyl chloride, poly(vinylacetal), polycarbonates, homo- and copolymers of olefins such as polyethylene and polypropylene, and the like.

Polyester sheets are particularly advantageous because they provide excellent strength and dimensional stability. Such polyester sheets are well known; widely used, and typically prepared from high molecular weight polyesters prepared by condensing a dihydric alcohol with a dibasic saturated fatty acid or derivative thereof.

Suitable dihydric alcohols for use in preparing such polyesters are well known in the art and include any glycol wherein the hydroxyl groups are on the terminal carbon atom and contain from two to twelve carbon atoms such as, for example, ethylene glycol, propylene glycol, trimethylene glycol, hexamethylene glycol, decamethylene glycol, dodecamethylene glycol, 1,4-cyclohexanedimethanol, and the like.

Suitable dibasic acids useful for the preparation of polyesters include: those containing from 2 to 16 carbon atoms such as adipic acid, sebacic acid, isophthalic acid, terephthalic acid, and the like. Alkyl esters of acids such as those listed above can also be employed. Other alcohols and acids, as well as polyesters, prepared therefrom and the preparation of the polyesters are described in U.S. Pat. Nos. 2,720,503 and 2,901,466. Polyethylene terephthalate is preferred.

Polyester support stiffness can range from about 15 millinewtons to 100 millinewtons. The preferred stiffness is between 20 and 100 millinewtons. Polyester stiffness less than 15 millinewtons does not provide the required stiffness for display materials in that they will be difficult to handle and do not lay flat for optimum viewing. Polyester stiffness greater than 100 millinewtons begins to exceed the stiffness limit for processing equipment and has no performance benefit for the display materials.

Generally polyester films supports are prepared by melt extruding the polyester through a slit die, quenching to the amorphous state, orienting by machine and cross direction stretching and heat setting under dimensional restraint. The polyester film can also be subjected to a heat relaxation treatment to improve dimensional stability and surface smoothness.

The polyester film will typically contain and undercoat or primer layer on both sides of the polyester film. Subbing layers used to promote adhesion of coating compositions to the support are well known in the art and any such material can be employed. Some useful compositions for this purpose include interpolymers of vinylidene chloride such as vinylidene chloride/methyl acrylate/itaconic acid terpolymers or vinylidene chloride/acrylonitrile/acrylic acid terpolymers, and the like. These and other suitable compositions are described, for example, in U.S. Pat. Nos. 2,627,088; 2,698,240; 2,943,937; 3,143,421; 3,201,249; 3,271,178; 3,443,950; and 3,501,301. The polymeric subbing layer is usually overcoated with a second subbing layer comprised of gelatin, typically referred to as gel sub.

The base also may be a microvoided polyethylene terephthalate such as disclosed in U.S. Pat. Nos. 4,912,333; 4,994,312; and 5,055,371.

A transparent polymer base free of $TiO_2$ is preferred because the $TiO_2$ in the transparent polymer gives additional light scattering. The $TiO_2$ pigmented transparent polymer also is expensive because the $TiO_2$ must be dispersed into the entire thickness, typically from 100 to 180 micrometers. The $TiO_2$ also gives the transparent polymer support a slight yellow tint which is undesirable for a photographic display material. For use as a photographic reflection display material, a transparent polymer support containing $TiO_2$ must also be tinted blue to offset the yellow tint of the polyester causing a loss in desired whiteness and adding cost to the display material. Concentration of the white pigment in the polyolefin layer allows for efficient use of the white pigment which improves image quality and reduces the cost of the imaging support.

When working with polyester film base sheets in conjunction with biaxially oriented sheet, static accumulation and discharge becomes a problem. The problem of controlling static charge is well known in the field of photography. The accumulation of charge on film or paper surfaces leads to the attraction of dirt, which can produce physical defects. The discharge of accumulated charge during or after the application of the sensitized emulsion layer(s) can produce irregular fog patterns or "static marks" in the emulsion. The static problems have been aggravated by increase in the sensitivity of new emulsions, increase in coating machine speeds, and increase in post-coating drying efficiency. The charge generated during the coating process may accumulate during winding and unwinding operations, during transport through the coating machines and during finishing operations such as slitting and spooling.

It is generally known that electrostatic charge can be dissipated effectively by incorporating one or more electrically-conductive "antistatic" layers into the film structure. Antistatic layers can be applied to one or to both sides of the film base as subbing layers either beneath or on the side opposite to the light-sensitive silver halide emulsion layers. An antistatic layer can alternatively be applied as an outer coated layer either over the emulsion layers or on the side of the film base opposite to the emulsion layers or both. For some applications, the antistatic agent can be incorporated into the emulsion layers. Alternatively, the antistatic agent can be directly incorporated into the film base itself.

A wide variety of electrically-conductive materials can be incorporated into antistatic layers to produce a wide range of conductivities. These can be divided into two broad groups: (i) ionic conductors and (ii) electronic conductors. In ionic conductors, charge is transferred by the bulk diffusion of charged species through an electrolyte. Here the resistivity of the antistatic layer is dependent on temperature and humidity. Antistatic layers containing simple inorganic salts, alkali metal salts of surfactants, ionic conductive polymers, polymeric electrolytes containing alkali metal salts, and colloidal metal oxide sols (stabilized by metal salts), described previously in patent literature, fall in this category. However, many of the inorganic salts, polymeric electrolytes, and low molecular weight surfactants used are water-soluble and are leached out of the antistatic layers during processing, resulting in a loss of antistatic function. The conductivity of antistatic layers employing an electronic conductor depends on electronic mobility rather than ionic mobility and is independent of humidity. Antistatic layers which contain conjugated polymers, semiconductive metal halide salts, semiconductive metal oxide particles, etc., have been described previously. However, these antistatic layers typically contain a high volume percentage of electronically conducting materials which are often expensive and impart unfavorable physical characteristics, such as color, increased brittleness, and poor adhesion to the antistatic layer.

Besides antistatic properties, an auxiliary layer in a photographic element maybe required to fulfill additional criteria depending on the application. For example, for resin-coated photographic paper, the antistatic layer if present as an external backing layer should be able to receive prints (e.g., bar codes or other indicia containing useful information) typically administered by dot matrix printers and to retain these prints or markings as the paper undergoes processing. Most colloidal silica based antistatic backings without a polymeric binder provide poor post-processing backmark retention qualities for photographic paper. Typical antistat used in this application include a conductive agent comprises alkali metal salts of polyacids or cellulose derivatives. Other conductive agent comprises polymerized alkylene oxides and alkali metal salts.

In a preferred embodiment of this invention, at least one of the two polymer sheets joined by a thermoplastic adhesive that forms the display material has an antistat material below the base and above the bottom photosensitive layer. It is desirable to have an antistat that has an electrical surface resistivity of at least $10^{13}$ log ohms/square. In the most preferred embodiment, the antistat material comprises at least one material selected from the group consisting of tin oxide and vanadium pentoxide.

As a stand-alone or supplement to the polymer sheet comprising an antistatic layer, said thermoplastic adhesive may also further comprise an antistatic agent selected from the group consisting of conductive metal oxides, carbon particles, and synthetic smectite clay, or multilayered with an inherently conductive polymer. In one of the preferred embodiments, the antistat material is metal oxides. Metal oxides are preferred because they are readily dispersed in the thermoplastic adhesive and can be applied to the polymer sheet by any means known in the art. Conductive metal oxides that may be useful in this invention are selected from the group consisting of conductive particles including doped-metal oxides, metal oxides containing oxygen deficiencies, metal antimonates, conductive nitrides, carbides, or borides, for example, $TiO_2$, $SnO_2$, $Al_2O_3$, $ZrO_3$, $In_2O_3$, $MgO$, $ZnSb_2O_6$, $InSbO_4$, $TiB_2$, $ZrB_2$, $NbB_2$, $TaB_2$, $CrB_2$, $MoB$, $WB$, $LaB_6$, $ZrN$, $TiN$, $TiC$, and $WC$. The most preferred materials are tin oxide and vanadium pentoxide because they provide excellent conductivity and are transparent.

When using a polyester base or other transparent polymer base, it is preferable to adhesive laminate the microvoided composite sheets to the base polymer using a non melt extrudable adhesive. The adhesive used to adhere the biaxially oriented polyolefin sheet to the polyester base may be any suitable material that does not have a harmful effect upon the photographic element. These type of adhesives are prepared either in aqueous or solvent form and applied to either the polyester or biaxially oriented sheet, dried to remove the solvent and then laminated by bringing together the biaxially oriented sheet and the polyester polymer sheet (base) with the already applied adhesive between the two sheets. In one of the embodiments of this invention, an imaging member comprises at least two polymer sheets that are joined by thermoplastic adhesives selected from the group consisting of acrylic, polyamide, polyester and polyurethane resins, or tri-block copolymers having an elastomeric block in the center and a thermoplastic block on each end being further modified with hydrogenated hydrocarbon resins. One of the preferred methods of forming an imaging member is bringing two webs of which at least one comprises a layer of thermoplastic adhesive that is facing the other web together in a nip formed by two rollers, with pressure and in the case of thermoplastic adhesives with heat. In an additional preferred embodiment of this invention, an imaging member comprising at least two polymer sheets joined by solvent based thermoplastic adhesive applied to at least one said at least two polymer sheets between 15 and 50° C. Polyester adhesive is preferred because it can be coated at low coating weight, thereby reducing the overall thickness of the display material. The use of thermoplastic adhesives and, in particular, polyester adhesive is preferred over extrusion lamination because the thinnest of the layer further provides protection against handling damages such as kinks. When making display materials using voided layers, it is important to protect the voids from excessive compression cracking. One means to achieve this is by reducing the thickness of the adhesive layer. In an additional embodiment the polyester resin consists of a thermoplastic, high molecular weight, aromatic, linear saturated polyester. One such material is commercially available under the tradename VITEL 3200B from Bostik, Inc. Similar polyester resins include MOR-ESTER 49007 from Morton International, Inc. These materials are desirable because they are readily dissolved in solvent and are easy to coat. The bond between the two polymer sheets is excellent using these materials and, when slit, the edges are clean and do not result in contamination or slit edge quality problems. The VITEL 3200B from Bostik, Inc. and MOR-ESTER 49007 from Morton International, Inc. are preferred because they are transparent and also remain essential colorless over the useful life of the display material (i.e., maintains a neutral or flat optical absorbency of less than 0.1 nm throughout the wavelength region of 400 to 800 nm). The average useful life for most display material is approximately one year, but in some cases the display may be much longer. Said thermoplastic adhesive and, in particular, the polyester adhesive further comprises an aromatic hydrocarbons, oxygenated solvents (most typically ketones), halogenated hydrocarbons (most typically chlorinated hydrocarbons), and nitroparaffins. The most preferred solvents are methylethyl ketone and toluene. Said adhesive may be coated from either solvent or combination thereof.

In an additional embodiment, the adhesive further comprises a cross-linked thermoplastic and preferably a cross-linked polyester adhesive. Typically thermoplastic adhesives may be cross-linked using amino resins, epoxy resins, aziridines, or isocyanate compounds (preferably a polyisocyanate based on isophrone diisocyanate. Polyisocyanate is preferred because it provides excellent pot life while coating the adhesive and require less energy. Catalysts may also be employed to facilitate cross-linking even further. Typically isocyanate, such as BOSCODUR 16 from Bostik, Inc. or Coreactant 9L10 from Morton International, Inc., may be used. In addition, typical catalysts that may be used include organo tin compounds and amines. The addition of cross-linking in the adhesive layer is desirable to provide a stronger layer to resist bending, but more also to provide a less elastic layer during slitting. When gummy pressure sensitive adhesives or elastic layers are placed between polymer sheets, problems may be encountered during slitting. The more elastic or gummy layers will cause problems with stringers of adhesives being pulled and stretched during slitting. This creates an appearance of poor slit quality, and the stringer may come loose and contaminate the display material. This is not desirable when making display materials because unsightly contamination detracts from the display message.

When display materials are made, they are often hung in areas that may receive various amounts of light radiation. Exposure of various polymers to visible and ultraviolet light can result in the degradation of the polymer. In a further embodiment of this invention, said adhesive layer may contains an ultraviolet light absorber or stabilizer selected from the group consisting of benzophenones and diphenyl acrylates. These materials are desirable because they provide excellent protection from degradation and help assure that the adhesive polymers do not significantly degrade or yellow over the useful life of the product. Furthermore, the ultraviolet protection absorbers help to protect the image dyes on the backside of the duplicated display material.

In yet another embodiment of this invention, a method of forming an imaging member comprising two polymer sheets bringing said polymer sheets together as a thermoplastic adhesive is applied to at least one of said sheets, dried and applying heat and pressure in a roller nip to the joined polymer sheets. Said thermoplastic adhesive may be selected from the group of materials described above, the solvent used to dissolve the adhesive may also be selected from the group described above and the adhesive may further comprises a cross-linking material also described above. The polymer sheets used to form the imaging member are disclosed in the detailed section below.

The coating method used to apply the adhesive may be any known in the art. This may include slot die, curtain coating, roller and roller transfer, air knife, rod, or other. The most important attribute is to apply a thin, uniform layer. In the formation of an imaging member comprising at least two polymer sheets with a cross-linked polyester adhesive, said adhesive is present in the amount of 0.06 $g/m^2$ to 7.4 $g/m^2$ or 0.06 to 7.0 micrometers. While thin layers below 0.06 $g/m^2$ may be desirable, it is difficult to maintain good uniform coating layers. Coverages above 7.4 $g/m^2$ may have some potential advantages for higher stiffness, but in general this is not a very cost effective means to achieve additional stiffness. Higher coverages in general are also more prone to slitting problems and also have a negative impact on voided layer cracking that may occur during handling. It has been found that there is no significant adhesion difference over this coverage range. For display applications, a preferred embodiment of this invention is an imaging member with a peel strength of greater than 175 g/5 cm. The peel strength is measured using per ASTM procedure D-1876. If the bond strength to separate the two adhesively joined sheets is greater than the z directional strength of the multilayer polymer sheet, the failure may occur internal to the sheet. In either of these cases, the bond strength is great enough to provide satisfactory performance for the life of the display material.

When laminating two polymer sheets together and, in particular, when one of the sheets is a biaxially oriented polyolefin sheet, problems with static and dirt attraction become a problem. While there are many ways to manage the overall static charge on these sheets using ionized air, static tinsel or string, carbon fiber brushes and other, one of the more effective means is to incorporate a conductive layer on one or more of the polymer sheets. In a preferred embodiment of this invention, said polyester adhesive comprises an antistat that has an electrical resistance of less than $10^{13}$ log ohms/square. The conductive adhesive layer is preferred because the added functionalization of static control is incorporated at the time of coating the adhesive. This also helps to minimize charge patterns that occur during the application of the adhesive which may result in nonuniform lay down or static induced imperfections. When viewing a display material in either reflected or transmitted light, adhesive layer with coating imperfections are objectionable.

Another attribute of the preferred adhesive embodiment of this invention for imaging display materials is for the thermoplastic adhesive to have an optical clarity of at least 80%. Optical clarity of less than 80% becomes very hazy and turbid and can interfere with the viewing of the display material. An optical clarity closer to 100% is much more transparent and does not interfere with the colors in the image. In a further embodiment of this invention, the polyester adhesive should not yellow or discolor with age and/or exposure to lighting conditions. While most display materials used in advertisements have a limited life, the selection of adhesive and the addition of antioxidants are important to prevent yellowing problems.

The imaging member of the preferred embodiment of this invention may comprise at least two polymer sheets laminated together with a thermoplastic adhesive wherein said polymer sheets comprise any combination of polyolefins, polyester, polyamides, and polycarbonates, and in the most preferred embodiment the imaging member comprises a sheet of polyolefin and a sheet of polyester. Polyolefins are preferred because when voided, they form a superior diffusion layer for duplitized imaging materials. Furthermore, they can be functionalized with a polyethylene skin layer which provides excellent adhesion for gelatin based silver halide emulsion layers. Polyester polymer sheets are preferred for their high modulus that add strength for improved handling characteristics. Adhesion of the thermoplastic adhesives to the polyester polymer sheet is also very good. Polycarbonates and polyamides provide excellent scratch resistance and overall durability.

In addition to the preferred properties of the polymer sheets, one or more of said sheets may further comprise an antistatic material. Such material may be integral to the polymer sheet or coextruded as a layer within the polymer sheet, or the polymer sheet may be coated with a separate layer of antistat containing material. The incorporation of an antistat in or on the polymer sheet is preferred because it eliminates static during the adhesive coating process. Without an antistat, the polymer webs will accumulate static and may cause static induced coating defects. Additional details and preferred materials that may be used have been disclosed in the above details.

When the two polymer sheets have been joined with the thermoplastic adhesive, the said imaging member has a spectral transmission greater than 38%. Having a spectral transmission of greater than 38% is desirable to provide a display material that is very pleasing in backlit conditions. If the imaging member is too opaque, the display material has difficulty in projecting a vibrant image that grabs the attention of the viewer.

In an additional embodiment of this invention, said imaging member may comprise at least one image layer. Said image layer may comprise a plurality of layers on one or more sides of said imaging member. In the field of commercial display it may be desirable to have an image layer of the top and the bottom side. This embodiment provides a unique imaging member that, when used with a reflective and diffusive member between the two imaging layers, has the ability to be viewed in either reflective or transmitted lighting condition with the same viewing pleasure.

In an additional embodiment wherein there is a top and a bottom imaging layer, the bottom imaging layer, that is, the layer furthest away from the viewer, further comprises a tone enhancing layer and an antihalation layer. The tone enhancing layer may comprise a white pigment such as $TiO_2$ and the antihalation layer may comprises dyes that are light absorbing. Both the tone enhancing and antihalation layers are located in the bottommost layers of the imaging layer. The tone enhancing layer provides a limited amount of spectral reflection to enhancing the sharpness and photographic speed of the bottommost imaging layer. The antihalation layer provides a means of preventing secondary exposure from surfaces in the photoexposing equipment.

In a further embodiment, the imaging member of this invention comprise two or more polymer sheets that are adhesively joined with an ultraviolet or E-beam curable adhesive. In a preferred embodiment, said curable adhesive is selected from the group consisting of acrylates, acrylate epoxies, acrylated polyester, acrylated urethanes, acrylated acrylics, epoxies resins, and polyisobutlene. Curable adhesives are preferred because they can be quickly cured without and do not require the handling or evaporation of solvents that is common in other thermoset adhesives.

As used herein, the phrase "photographic element" is a material that utilizes photosensitive silver halide in the formation of images. The photographic elements can be black and white, single color elements or multicolor elements. Multicolor elements contain image dye-forming units sensitive to each of the three primary regions of the spectrum. Each unit can comprise a single emulsion layer or multiple emulsion layers sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer.

For the display material of this invention, at least one image layer containing silver halide and a dye forming coupler located on the topside and bottom side of said imaging element is suitable. Applying the imaging layer to either the top and bottom is suitable for a photographic display material, but it is not sufficient to create a photographic display material that is optimum for both a reflection display and a transmission display. For the display material of this invention, at least one image layer comprises at least one dye forming coupler located on both the top and bottom of the imaging support of this invention is preferred. Applying an imaging layer to both the top and bottom of the support allows for the display material to have the required density for both reflective viewing and for transmission viewing of the image. This duplitized "day/night" photographic display material has significant commercial value in that the day/night display material can be used for both reflective viewing and transmission viewing. Prior art display materials were optimized for either transmission viewing or reflective viewing but not both simultaneously.

It has been found that the duplitized emulsion coverage should be in a range that is greater than 75% and less than 175% of the typical emulsion coverages for reflective consumer paper that contains typical amounts of silver and coupler. At coverages of less than 75% on the front side, it was found that a pleasing reflection print could not be obtained. Further, at coverages of less than 75% on the backside, pleasing transmission images could not be obtained. Coverages greater than 175% are undesirable because of the increased material expense and also because of the need for extended development times in the processing solutions. In a more preferred embodiment, emulsion laydowns should be between 100–150% of that found for a typical reflective consumer color paper.

The display material of this invention, wherein the amount of dye forming coupler is substantially the same on the top and bottom sides, is most preferred because it allows for optimization of image density while allowing for developer time less than 50 seconds. Further, coating substantially the same amount of light sensitive silver halide emulsion on both sides has the additional benefit of balancing the imaging element for image curl caused by the contraction and expansion of the hygroscopic gel typically found in photographic emulsions.

The photographic emulsions useful for this invention are generally prepared by precipitating silver halide crystals in a colloidal matrix by methods conventional in the art. The colloid is typically a hydrophilic sheet forming agent such as gelatin, alginic acid, or derivatives thereof.

The crystals formed in the precipitation step are washed and then chemically and spectrally sensitized by adding spectral sensitizing dyes and chemical sensitizers, and by providing a heating step during which the emulsion temperature is raised, typically from 40° C. to 70° C., and maintained for a period of time. The precipitation and spectral and chemical sensitization methods utilized in preparing the emulsions employed in the invention can be those methods known in the art.

Chemical sensitization of the emulsion typically employs sensitizers such as sulfur-containing compounds, e.g., allyl isothiocyanate, sodium thiosulfate and allyl thiourea; reducing agents, e.g., polyamines and stannous salts; noble metal compounds, e.g., gold, platinum; and polymeric agents, e.g., polyalkylene oxides. As described, heat treatment is employed to complete chemical sensitization. Spectral sensitization is effected with a combination of dyes, which are designed for the wavelength range of interest within the visible or infrared spectrum. It is known to add such dyes both before and after heat treatment.

After spectral sensitization, the emulsion is coated on a support using known coating techniques such as bead and curtain coating.

The silver halide emulsions utilized in this invention may be comprised of any halide distribution. Thus, they may be comprised of silver chloride, silver bromide, silver bromochloride, silver chlorobromide, silver iodochloride, silver iodobromide, silver bromoiodochloride, silver chloroiodobromide, silver iodobromochloride, and silver iodochlorobromide emulsions. It is preferred, however, that the emulsions be predominantly silver chloride emulsions. By predominantly silver chloride, it is meant that the grains of the emulsion are greater than about 50 mole percent silver chloride. Preferably, they are greater than about 90 mole percent silver chloride; and optimally greater than about 95 mole percent silver chloride.

The silver halide emulsions can contain grains of any size and morphology. Thus, the grains may take the form of cubes, octahedrons, cubo-octahedrons, or any of the other naturally occurring morphologies of cubic lattice type silver halide grains. Further, the grains may be irregular such as spherical grains or tabular grains. Grains having a tabular or cubic morphology are preferred.

The photographic elements of the invention may utilize emulsions as described in *The Theory of the Photographic Process,* Fourth Edition, T. H. James, Macmillan Publishing Company, Inc., 1977, pages 151–152. Reduction sensitization has been known to improve the photographic sensitivity of silver halide emulsions. While reduction sensitized silver halide emulsions generally exhibit good photographic speed, they often suffer from undesirable fog and poor storage stability.

Reduction sensitization can be performed intentionally by adding reduction sensitizers, chemicals that reduce silver ions to form metallic silver atoms, or by providing a reducing environment such as high pH (excess hydroxide ion) and/or low pAg (excess silver ion). During precipitation of a silver halide emulsion, unintentional reduction sensitization can occur when, for example, silver nitrate or alkali solutions are added rapidly or with poor mixing to form emulsion grains. Also, precipitation of silver halide emulsions in the presence of ripeners (grain growth modifiers) such as thioethers, selenoethers, thioureas, or ammonia tends to facilitate reduction sensitization.

Examples of reduction sensitizers and environments which may be used during precipitation or spectral/chemical sensitization to reduction sensitize an emulsion include ascorbic acid derivatives; tin compounds; polyamine compounds; and thiourea dioxide-based compounds described in U.S. Pat. Nos. 2,487,850; 2,512,925; and British Patent 789,823. Specific examples of reduction sensitizers or conditions, such as dimethylamineborane, stannous chloride, hydrazine, high pH (pH 8–11) and low pAg (pAg 1–7) ripening are discussed by S. Collier in Photographic Science and Engineering, 23,113 (1979). Examples of processes for preparing intentionally reduction sensitized silver halide emulsions are described in EP 0 348 934 A1 (Yamashita), EP 0 369 491 (Yamashita), EP 0 371 388 (Ohashi), EP 0 396 424 A1 (Takada), EP 0 404 142 A1 (Yamada), and EP 0 435 355 A1 (Makino).

The photographic elements of this invention may use emulsions doped with Group VIII metals such as iridium, rhodium, osmium, and iron as described in *Research Disclosure,* September 1994, Item 36544, Section I, published by Kenneth Mason Publications, Ltd., Dudley Annex, 12a North Street, Emsworth, Hampshire PO10 7DQ, ENGLAND. Additionally, a general summary of the use of iridium in the sensitization of silver halide emulsions is contained in Carroll, "Iridium Sensitization: A Literature Review," Photographic Science and Engineering, Vol. 24, No. 6, 1980. A method of manufacturing a silver halide emulsion by chemically sensitizing the emulsion in the presence of an iridium salt and a photographic spectral sensitizing dye is described in U.S. Pat. No. 4,693,965. In some cases, when such dopants are incorporated, emulsions show an increased fresh fog and a lower contrast sensitometric curve when processed in the color reversal E-6 process as described in The British Journal of Photography Annual, 1982, pages 201–203.

A typical multicolor photographic element of the invention comprises the invention laminated support bearing a cyan dye image-forming unit comprising at least one red-sensitive silver halide emulsion layer having associated therewith at least one cyan dye-forming coupler; a magenta image-forming unit comprising at least one green-sensitive silver halide emulsion layer having associated therewith at least one magenta dye-forming coupler; and a yellow dye image-forming unit comprising at least one blue-sensitive silver halide emulsion layer having associated therewith at least one yellow dye-forming coupler. The element may contain additional layers, such as filter layers, interlayers, overcoat layers, subbing layers, and the like. The support of the invention may also be utilized for black-and-white photographic print elements.

When the base material of the invention with the integral diffusion layer is coated with silver halide photographic element, it is capable of excellent performance when exposed by either an electronic printing method or a conventional optical printing method. An electronic printing method comprises subjecting a radiation sensitive silver halide emulsion layer of a recording element to actinic radiation of at least $10^{-4}$ ergs/cm$^2$ for up to $100\mu$ seconds duration in a pixel-by-pixel mode wherein the silver halide emulsion layer is comprised of silver halide grains as described above. A conventional optical printing method comprises subjecting a radiation sensitive silver halide emulsion layer of a recording element to actinic radiation of at least $10^{-4}$ ergs/cm$^2$ for $10^{-3}$ to 300 seconds in an imagewise mode wherein the silver halide emulsion layer is comprised of silver halide grains as described above.

This invention in a preferred embodiment utilizes a radiation-sensitive emulsion comprised of silver halide grains (a) containing greater than 50 mole percent chloride, based on silver, (b) having greater than 50 percent of their surface area provided by {100} crystal faces, and (c) having a central portion accounting for from 95 to 99 percent of total silver and containing two dopants selected to satisfy each of the following class requirements: (i) a hexacoordination metal complex which satisfies the formula $$[ML_6]^n \quad (I)$$

wherein n is zero, −1, −2, −3, or −4; M is a filled frontier orbital polyvalent metal ion, other than iridium; and $L_6$ represents bridging ligands which can be independently selected, provided that least four of the ligands are anionic ligands, and at least one of the ligands is a cyano ligand or a ligand more electronegative than a cyano ligand; and (ii) an iridium coordination complex containing a thiazole or substituted thiazole ligand.

It has been discovered quite surprisingly that the combination of dopants (i) and (ii) provides greater reduction in reciprocity law failure than can be achieved with either dopant alone. Further, unexpectedly, the combination of dopants (i) and (ii) achieves reductions in reciprocity law failure beyond the simple additive sum achieved when employing either dopant class by itself. It has not been reported or suggested prior to this invention that the combination of dopants (i) and (ii) provides greater reduction in reciprocity law failure, particularly for high intensity and short duration exposures. The combination of dopants (i) and (ii) further unexpectedly achieves high intensity reciprocity with iridium at relatively low levels, and both high and low intensity reciprocity improvements even while using conventional gelatino-peptizer (e.g., other than low methionine gelatino-peptizer).

In a preferred practical application, the advantages of the invention can be transformed into increased throughput of digital substantially artifact-free color print images while exposing each pixel sequentially in synchronism with the digital data from an image processor.

In one embodiment, the present invention represents an improvement on the electronic printing method. Specifically, this invention in one embodiment is directed to an electronic printing method which comprises subjecting a radiation sensitive silver halide emulsion layer of a recording element to actinic radiation of at least $10^{-4}$ ergs/cm$^2$ for up to 100$\mu$ seconds duration in a pixel-by-pixel mode. The present invention realizes an improvement in reciprocity failure by selection of the radiation sensitive silver halide emulsion layer. While certain embodiments of the invention are specifically directed towards electronic printing, use of the emulsions and elements of the invention is not limited to such specific embodiments, and it is specifically contemplated that the emulsions and elements of the invention are also well suited for conventional optical printing.

It has been unexpectedly discovered that significantly improved reciprocity performance can be obtained for silver halide grains (a) containing greater than 50 mole percent chloride, based on silver, and (b) having greater than 50 percent of their surface area provided by {100} crystal faces by employing a hexacoordination complex dopant of class (i) in combination with an iridium complex dopant comprising a thiazole or substituted thiazole ligand. The reciprocity improvement is obtained for silver halide grains employing conventional gelatino-peptizer, unlike the contrast improvement described for the combination of dopants set forth in U.S. Pat. Nos. 5,783,373 and 5,783,378, which requires the use of low methionine gelatino-peptizers as discussed therein, and which states it is preferable to limit the concentration of any gelatino-peptizer with a methionine level of greater than 30 micromoles per gram to a concentration of less than 1 percent of the total peptizer employed. Accordingly, in specific embodiments of the invention, it is specifically contemplated to use significant levels (i.e., greater than 1 weight percent of total peptizer) of conventional gelatin (e.g., gelatin having at least 30 micromoles of methionine per gram) as a gelatino-peptizer for the silver halide grains of the emulsions of the invention. In preferred embodiments of the invention, gelatino-peptizer is employed which comprises at least 50 weight percent of gelatin containing at least 30 micromoles of methionine per gram, as it is frequently desirable to limit the level of oxidized low methionine gelatin which may be used for cost and certain performance reasons.

In a specific, preferred form of the invention it is contemplated to employ a class (i) hexacoordination complex dopant satisfying the formula:

$$[ML_6]^n \quad (I)$$

where
 n is zero, −1, −2, −3, or −4;
 M is a filled frontier orbital polyvalent metal ion, other than iridium, preferably Fe$^{+2}$, Ru$^{+2}$, Os$^{+2}$, Co$^{+3}$, Rh$^{+3}$, Pd$^{+4}$ or Pt$^{+4}$, more preferably an iron, ruthenium or osmium ion, and most preferably a ruthenium ion;
 $L_6$ represents six bridging ligands which can be independently selected, provided that least four of the ligands are anionic ligands and at least one (preferably at least 3 and optimally at least 4) of the ligands is a cyano ligand or a ligand more electronegative than a cyano ligand. Any remaining ligands can be selected from among various other bridging ligands, including aquo ligands, halide ligands (specifically, fluoride, chloride, bromide and iodide), cyanate ligands, thiocyanate ligands, selenocyanate ligands, tellurocyanate ligands, and azide ligands. Hexacoordinated transition metal complexes of class (i) which include six cyano ligands are specifically preferred.

Illustrations of specifically contemplated class (i) hexacoordination complexes for inclusion in the high chloride grains are provided by Olm et al U.S. Pat. No. 5,503,970 and Daubendiek et al U.S. Pat. Nos. 5,494,789 and 5,503,971, and Keevert et al U.S. Pat. No. 4,945,035, as well as Murakami et al Japanese Patent Application Hei-2[1990]-249588, and Research Disclosure Item 36736. Useful neutral and anionic organic ligands for class (ii) dopant hexacoordination complexes are disclosed by Olm et al U.S. Pat. No. 5,360,712 and Kuromoto et al U.S. Pat. No. 5,462,849.

Class (i) dopant is preferably introduced into the high chloride grains after at least 50 (most preferably 75 and optimally 80) percent of the silver has been precipitated, but before precipitation of the central portion of the grains has been completed. Preferably class (i) dopant is introduced before 98 (most preferably 95 and optimally 90) percent of the silver has been precipitated. Stated in terms of the fully precipitated grain structure, class (i) dopant is preferably present in an interior shell region that surrounds at least 50 (most preferably 75 and optimally 80) percent of the silver and, with the more centrally located silver, accounts the entire central portion (99 percent of the silver), most preferably accounts for 95 percent, and optimally accounts for 90 percent of the silver halide forming the high chloride grains. The class (i) dopant can be distributed throughout the interior shell region delimited above or can be added as one or more bands within the interior shell region.

Class (i) dopant can be employed in any conventional useful concentration. A preferred concentration range is from $10^{-8}$ to $10^{-3}$ mole per silver mole, most preferably from $10^{-6}$ to $5\times10^{-4}$ mole per silver mole.

The following are specific illustrations of class (i) dopants:

(i-1) $[Fe(CN)_6]^{-4}$
(i-2) $[Ru(CN)_6]^{-4}$
(i-3) $[Os(CN)_6]^{-4}$
(i-4) $[Rh(CN)_6]^{-3}$
(i-5) $[Co(CN)_6]^{-3}$
(i-6) $[Fe(pyrazine)(CN)_5]^{-4}$
(i-7) $[RuCl(CN)_5]^{-4}$
(i-8) $[OsBr(CN)_5]^{-4}$
(i-9) $[RhF(CN)_5]^{-3}$
(i-10) $[In(NCS)_6]^{-3}$
(i-11) $[FeCO(CN)_5]^{-3}$
(i-12) $[RuF_2(CN)_4]^{-4}$
(i-13) $[OsCl_2(CN)_4]^{-4}$
(i-14) $[RhI_2(CN)_4]^{-3}$
(i-15) $[Ga(NCS)_6]^{-3}$
(i-16) $[Ru(CN)_5(OCN)]^{-4}$
(i-17) $[Ru(CN)_5(N_3)]^{-4}$
(i-18) $[Os(CN)_5(SCN)]^{-4}$
(i-19) $[Rh(CN)_5(SeCN)]^{-3}$
(i-20) $[Os(CN)Cl_5]^{-4}$
(i-21) $[Fe(CN)_3Cl_3]^{-3}$
(i-22) $[Ru(CO)_2(CN)_4]^{-1}$ When the class (i) dopants have a net negative charge, it is appreciated that they are associated with a counter ion when added to the reaction vessel during precipitation. The counter ion is of little importance, since it is tonically dissociated from the dopant in solution and is not incorporated within the grain. Common counter ions known to be fully compatible with silver chloride precipitation, such as ammonium and alkali metal ions, are contemplated. It is noted that the same comments apply to class (ii) dopants, otherwise described below.

The class (ii) dopant is an iridium coordination complex containing at least one thiazole or substituted thiazole ligand. Careful scientific investigations have revealed Group VIII hexahalo coordination complexes to create deep electron traps, as illustrated R. S. Eachus, R. E. Graves and M. T. Olm *J Chem. Phys.*, Vol. 69, pp. 4580–7 (1978) and *Physica Status Solidi A*, Vol. 57, 429–37 (1980) and R. S. Eachus and M. T. Olm *Annu. Rep. Prog. Chem. Sect. C. Phys. Chem.*, Vol. 83, 3, pp. 3–48 (1986). The class (ii) dopants employed in the practice of this invention are believed to create such deep electron traps. The thiazole ligands may be substituted with any photographically acceptable substituent which does not prevent incorporation of the dopant into the silver halide grain. Exemplary substituents include lower alkyl (e.g., alkyl groups containing 1–4 carbon atoms), and specifically methyl. A specific example of a substituted thiazole ligand which may be used in accordance with the invention is 5-methylthiazole. The class (ii) dopant preferably is an iridium coordination complex having ligands each of which are more electropositive than a cyano ligand. In a specifically preferred form the remaining non-thiazole or non-substituted-thiazole ligands of the coordination complexes forming class (ii) dopants are halide ligands.

It is specifically contemplated to select class (ii) dopants from among the coordination complexes containing organic ligands disclosed by Olm et al U.S. Pat. No. 5,360,712; Olm et al U.S. Pat. No. 5,457,021; and Kuromoto et al U.S. Pat. No. 5,462,849.

In a preferred form it is contemplated to employ as a class (ii) dopant a hexacoordination complex satisfying the formula:

$$[IrL^1_6]^{n'} \qquad (II)$$

wherein n' is zero, −1, −2, −3, or −4; and $L^1_6$ represents six bridging ligands which can be independently selected, provided that at least four of the ligands are anionic ligands, each of the ligands is more electropositive than a cyano ligand, and at least one of the ligands comprises a thiazole or substituted thiazole ligand. In a specifically preferred form at least four of the ligands are halide ligands, such as chloride or bromide ligands.

Class (ii) dopant is preferably introduced into the high chloride grains after at least 50 (most preferably 85 and optimally 90) percent of the silver has been precipitated, but before precipitation of the central portion of the grains has been completed. Preferably class (ii) dopant is introduced before 99 (most preferably 97 and optimally 95) percent of the silver has been precipitated. Stated in terms of the fully precipitated grain structure, class (ii) dopant is preferably present in an interior shell region that surrounds at least 50 (most preferably 85 and optimally 90) percent of the silver and, with the more centrally located silver, accounts the entire central portion (99 percent of the silver), most preferably accounts for 97 percent, and optimally accounts for 95 percent of the silver halide forming the high chloride grains. The class (ii) dopant can be distributed throughout the interior shell region delimited above or can be added as one or more bands within the interior shell region.

Class (ii) dopant can be employed in any conventional useful concentration. A preferred concentration range is from $10^{-9}$ to $10^{-4}$ mole per silver mole. Iridium is most preferably employed in a concentration range of from $10^{-8}$ to $10^{-5}$ mole per silver mole.

Specific illustrations of class (ii) dopants are the following:

(ii-1) $[IrCl_5(thiazole)]^{-2}$
(ii-2) $[IrCl_4(thiazole)_2]^{-1}$
(ii-3) $[IrBr_5(thiazole)]^{-2}$
(ii-4) $[IrBr_4(thiazole)_2]^{-1}$
(ii-5) $[IrCl_5(5-methylthiazole)]^{-2}$
(ii-6) $[IrCl_4(5-methylthiazole)_2]^{-1}$
(ii-7) $[IrBr_5(5-methylthiazole)]^{-2}$
(ii-8) $[IrBr_4(5-methylthiazole)_2]^{-1}$ In one preferred aspect of the invention in a layer using a magenta dye forming coupler, a class (ii) dopant in combination with an $OsCl_5(NO)$ dopant has been found to produce a preferred result.

Emulsions demonstrating the advantages of the invention can be realized by modifying the precipitation of conventional high chloride silver halide grains having predominantly (>50%) {100} crystal faces by employing a combination of class (i) and (ii) dopants as described above.

The silver halide grains precipitated contain greater than 50 mole percent chloride, based on silver. Preferably the grains contain at least 70 mole percent chloride and, optimally at least 90 mole percent chloride, based on silver. Iodide can be present in the grains up to its solubility limit, which is in silver iodochloride grains, under typical conditions of precipitation, about 11 mole percent, based on silver. It is preferred for most photographic applications to limit iodide to less than 5 mole percent iodide, most preferably less than 2 mole percent iodide, based on silver.

Silver bromide and silver chloride are miscible in all proportions. Hence,: any portion, up to 50 mole percent, of the total halide not accounted for chloride and iodide, can be bromide. For color reflection print (i.e., color paper) uses bromide is typically limited to less than 10 mole percent based on silver, and iodide is limited to less than 1 mole percent based on silver.

In a widely used form high chloride grains are precipitated to form cubic grains--that is, grains having {100} major faces and edges of equal length. In practice ripening effects usually round the edges and corners of the grains to some extent. However, except under extreme ripening conditions substantially more than 50 percent of total grain surface area is accounted for by {100} crystal faces.

High chloride tetradecahedral grains are a common variant of cubic grains. These grains contain 6 {100} crystal faces and 8 {111} crystal faces. Tetradecahedral grains are within the contemplation of this invention to the extent that greater than 50 percent of total surface area is accounted for by {100} crystal faces.

Although it is common practice to avoid or minimize the incorporation of iodide into high chloride grains employed in color paper, it is has been recently observed that silver iodochloride grains with {100} crystal faces and, in some instances, one or more {111} faces offer exceptional levels of photographic speed. In the these emulsions iodide is incorporated in overall concentrations of from 0.05 to 3.0 mole percent, based on silver, with the grains having a surface shell of greater than 50 Å that is substantially free of iodide and a interior shell having a maximum iodide concentration that surrounds a core accounting for at least 50 percent of total silver. Such grain structures are illustrated by Chen et al EPO 0 718 679.

In another improved form the high chloride grains can take the form of tabular grains having {100} major faces. Preferred high chloride {100} tabular grain emulsions are those in which the tabular grains account for at least 70 (most preferably at least 90) percent of total grain projected area. Preferred high chloride {100} tabular grain emulsions have average aspect ratios of at least 5 (most preferably at least >8). Tabular grains typically have thicknesses of less than 0.3 μm, preferably less than 0.2 μm, and optimally less than 0.07 μm. High chloride {100} tabular grain emulsions and their preparation are disclosed by Maskasky U.S. Pat. Nos. 5,264,337 and 5,292,632; House et al U.S. Pat. No. 5,320,938; Brust et al U.S. Pat. No. 5,314,798; and Chang et al U.S. Pat. No. 5,413,904.

Once high chloride grains having predominantly {100} crystal faces have been precipitated with a combination of class (i) and class (ii) dopants described above, chemical and spectral sensitization, followed by the addition of conventional addenda to adapt the emulsion for the imaging application of choice can take any convenient conventional form. These conventional features are illustrated by *Research Disclosure*, Item 38957, cited above, particularly:

III. Emulsion washing;

IV. Chemical sensitization;

V. Spectral sensitization and desensitization;

VII. Antifoggants and stabilizers;

VIII. Absorbing and scattering materials;

IX. Coating and physical property modifying addenda; and

X. Dye image formers and modifiers.

Some additional silver halide, typically less than 1 percent, based on total silver, can be introduced to facilitate chemical sensitization. It is also recognized that silver halide can be epitaxially deposited at selected sites on a host grain to increase its sensitivity. For example, high chloride {100} tabular grains with corner epitaxy are illustrated by Maskasky U.S. Pat. No. 5,275,930. For the purpose of providing a clear demarcation, the term "silver halide grain" is herein employed to include the silver necessary to form the grain up to the point that the final {100} crystal faces of the grain are formed. Silver halide later deposited that does not overlie the {100} crystal faces previously formed accounting for at least 50 percent of the grain surface area is excluded in determining total silver forming the silver halide grains. Thus, the silver forming selected site epitaxy is not part of the silver halide grains while silver halide that deposits and provides the final {100} crystal faces of the grains is included in the total silver forming the grains, even when it differs significantly in composition from the previously precipitated silver halide.

Image dye-forming couplers may be included in the element such as couplers that form cyan dyes upon reaction with oxidized color developing agents which are described in such representative patents and publications as: U.S. Pat. Nos. 2,367,531; 2,423,730; 2,474,293; 2,772,162; 2,895,826; 3,002,836; 3,034,892; 3,041,236; 4,883,746 and "Farbkuppler—Eine Literature Ubersicht," published in Agfa Mitteilungen, Band III, pp. 156–175 (1961). Preferably such couplers are phenols and naphthols that form cyan dyes on reaction with oxidized color developing agent. Also preferable are the cyan couplers described in, for instance, European Patent Application Nos. 491,197; 544,322; 556,700; 556,777; 565,096; 570,006; and 574,948.

Typical cyan couplers are represented by the following formulas:

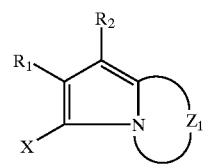

CYAN-1

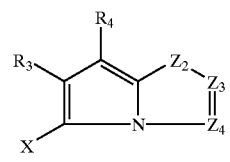

CYAN-2

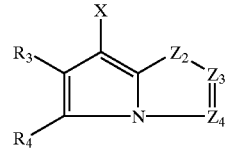

CYAN-3

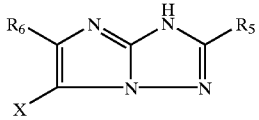

CYAN-4 wherein $R_1$, $R_5$ and $R_8$ each represents a hydrogen or a substituent; $R_2$ represents a substituent; $R_3$, $R_4$ and $R_7$ each represents an electron attractive group having a Hammett's substituent constant $\sigma_{para}$ of 0.2 or more and the sum of the $\sigma_{para}$ values of $R_3$ and $R_4$ is 0.65 or more; $R_6$ represents an electron attractive group having a Hammett's substituent constant $\sigma_{para}$ of 0.35 or more; X represents a hydrogen or a coupling-off group; $Z_1$ represents nonmetallic atoms necessary for forming a nitrogen-containing, six-membered, heterocyclic ring which has at least one dissociative group; $Z_2$ represents —C($R_7$)= and —N=; and $Z_3$ and $Z_4$ each represents —C($R_8$)= and —N=.

For purposes of this invention, an "NB coupler" is a dye-forming coupler which is capable of coupling with the developer 4-amino-3-methyl-N-ethyl-N-(2-methanesulfonamidoethyl) aniline sesquisulfate hydrate to form a dye for which the left bandwidth (LBW) of its absorption spectra upon "spin coating" of a 3% w/v solution of the dye in di-n-butyl sebacate solvent is at least 5 nm. less than the LBW for a 3% w/v solution of the same dye in acetonitrile. The LBW of the spectral curve for a dye is the distance between the left side of the spectral curve and the wavelength of maximum absorption measured at a density of half the maximum.

The "spin coating" sample is prepared by first preparing a solution of the dye in di-n-butyl sebacate solvent (3% w/v). If the dye is insoluble, dissolution is achieved by the addition of some methylene chloride. The solution is filtered and 0.1–0.2 ml is applied to a clear polyethylene terephthalate support (approximately 4 cm×4 cm) and spun at 4,000 RPM using the Spin Coating equipment, Model No. EC 101, available from Headway Research Inc., Garland Tex. The transmission spectra of the so prepared dye samples are then recorded.

Preferred "NB couplers" form a dye which, in n-butyl sebacate, has a LBW of the absorption spectra upon "spin coating" which is at least 15 nm, preferably at least 25 nm, less than that of the same dye in a 3% solution (w/v) in acetonitrile.

In a preferred embodiment the cyan dye-forming "NB coupler" useful in the invention has the formula (IA)

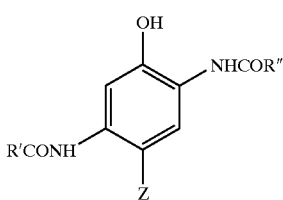

(IA)

wherein
R' and R" are substituents selected such that the coupler is a "NB coupler", as herein defined; and
Z is a hydrogen atom or a group which can be split off by the reaction of the coupler with an oxidized color developing agent.

The coupler of formula (IA) is a 2,5-diamido phenolic cyan coupler wherein the substituents R' and R" are preferably independently selected from unsubstituted or substituted alkyl, aryl, amino, alkoxy and heterocyclyl groups.

In a further preferred embodiment, the "NB coupler" has the formula (I):

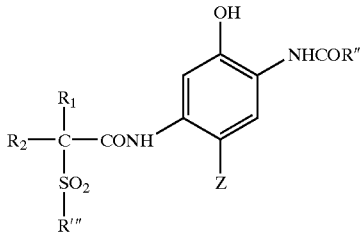

(I)

wherein
R" and R'" are independently selected from unsubstituted or substituted alkyl, aryl, amino, alkoxy and heterocyclyl groups and Z is as hereinbefore defined;
$R_1$ and $R_2$ are independently hydrogen or an unsubstituted or substituted alkyl group; and Typically, R" is an alkyl, amino or aryl group, suitably a phenyl group. R'" is desirably an alkyl or aryl group or a 5- to 10-membered heterocyclic ring which contains one or more heteroatoms selected from nitrogen, oxygen, and sulfur, which ring group is unsubstituted or substituted.

In the preferred embodiment the coupler of formula (I) is a 2,5-diamido phenol in which the 5-amido moiety is an amide of a carboxylic acid which is substituted in the alpha position by a particular sulfone (—$SO_2$—) group, such as, for example, described in U.S. Pat. No. 5,686,235. The sulfone moiety is an unsubstituted or substituted alkylsulfone or a heterocyclyl sulfone or it is an arylsulfone, which is preferably substituted, in particular, in the meta and/or para position.

Couplers having these structures of formulae (I) or (IA) comprise cyan dye-forming "NB couplers" which form image dyes having very sharp-cutting dye hues on the short wavelength side of the absorption curves with absorption maxima ($\lambda_{max}$) which are shifted hypsochromically and are generally in the range of 620–645 nm, which is ideally suited for producing excellent color reproduction and high color saturation in color photographic papers.

Referring to formula (I), $R_1$ and $R_2$ are independently hydrogen or an unsubstituted or substituted alkyl group, preferably having from 1 to 24 carbon atoms and, in particular, 1 to 10 carbon atoms, suitably a methyl, ethyl, n-propyl, isopropyl, butyl or decyl group or an alkyl group substituted with one or more fluoro, chloro or bromo atoms, such as a trifluoromethyl group. Suitably, at least one of $R_1$ and $R_2$ is a hydrogen atom, and if only one of $R_1$ and $R_2$ is a hydrogen atom, then the other is preferably an alkyl group having 1 to 4 carbon atoms, more preferably 1 to 3 carbon atoms, and desirably two carbon atoms.

As used herein and throughout the specification unless where specifically stated otherwise, the term "alkyl" refers to an unsaturated or saturated straight or branched chain alkyl group, including alkenyl, and includes aralkyl and cyclic alkyl groups, including cycloalkenyl, having 3–8 carbon atoms, and the term 'aryl' includes specifically fused aryl.

In formula (I), R" is suitably an unsubstituted or substituted amino, alkyl or aryl group or a 5- to 10-membered heterocyclic ring which contains one or more heteroatoms selected from nitrogen, oxygen, and sulfur, which ring is unsubstituted or substituted, but is more suitably an unsubstituted or substituted phenyl group.

Examples of suitable substituent groups for this aryl or heterocyclic ring include cyano, chloro, fluoro, bromo, iodo, alkyl- or aryl-carbonyl, alkyl- or aryl-oxycarbonyl, carbonamido, alkyl- or aryl-carbonamido, alkyl- or aryl-sulfonyl, alkyl- or aryl-sulfonyloxy, alkyl- or aryl-oxysulfonyl, alkyl- or aryl-sulfoxide, alkyl- or aryl-sulfamoyl, alkyl- or aryl-sulfonamido, aryl, alkyl, alkoxy, aryloxy, nitro, alkyl- or aryl-ureido and alkyl- or aryl-carbamoyl groups, any of which may be further substituted. Preferred groups are halogen, cyano, alkoxycarbonyl, alkylsulfamoyl, alkyl-sulfonamido, alkylsulfonyl, carbamoyl, alkylcarbamoyl or alkylcarbonamido. Suitably, R" is a 4-chlorophenyl, 3,4-di-chlorophenyl, 3,4-difluorophenyl, 4-cyanophenyl, 3-chloro-4-cyanophenyl, pentafluorophenyl, or a 3- or 4-sulfonamidophenyl group.

In formula (I) when R''' is alkyl, it may be unsubstituted or substituted with a substituent such as halogen or alkoxy. When R''' is aryl or a heterocycle, it may be substituted. Desirably it is not substituted in the position alpha to the sulfonyl group.

In formula (I), when R''' is a phenyl group, it may be substituted in the meta and/or para positions with one to three substituents independently selected from the group consisting of halogen, and unsubstituted or substituted alkyl, alkoxy, aryloxy, acyloxy, acylamino, alkyl- or aryl-sulfonyloxy, alkyl- or aryl-sulfamoyl, alkyl- or aryl-sulfamoylamino, alkyl- or aryl-sulfonamido, alkyl- or aryl-ureido, alkyl- or aryl-oxycarbonyl, alkyl- or aryl-oxycarbonylamino and alkyl- or aryl-carbamoyl groups.

In particular, each substituent may be an alkyl group such as methyl, t-butyl, heptyl, dodecyl, pentadecyl, octadecyl or 1,1,2,2-tetramethylpropyl; an alkoxy group such as methoxy, t-butoxy, octyloxy, dodecyloxy, tetradecyloxy, hexadecyloxy or octadecyloxy; an aryloxy group such as phenoxy, 4-t-butylphenoxy or 4-dodecyl-phenoxy; an alkyl- or aryl-acyloxy group such as acetoxy or dodecanoyloxy; an alkyl- or aryl-acylamino group such as acetamido, hexadecanamido or benzamido; an alkyl- or aryl-sulfonyloxy group such as methyl-sulfonyloxy, dodecylsulfonyloxy or 4-methylphenyl-sulfonyloxy; an alkyl- or aryl-sulfamoyl-group such as N-butylsulfamoyl or N-4-t-butylphenylsulfamoyl; an alkyl- or aryl-sulfamoylamino group such as N-butyl-sulfamoylamino or N-4-t-butylphenylsulfamoyl-amino; an alkyl- or aryl-sulfonamido group such as methane-sulfonamido, hexadecanesulfonamido or 4-chlorophenyl-sulfonamido; an alkyl- or aryl-ureido group such as methylureido or phenylureido; an alkoxy- or aryloxy-carbonyl such as methoxycarbonyl or phenoxycarbonyl; an alkoxy- or aryloxy-carbonylamino group such as methoxy-carbonylamino or phenoxycarbony-lamino; an alkyl- or aryl-carbamoyl group such as N-butylcarbamoyl or N-methyl-N-dodecylcarbamoyl; or a perfluoroalkyl group such as trifluoromethyl or heptafluoropropyl.

Suitably the above substituent groups have 1 to 30 carbon atoms, more preferably 8 to 20 aliphatic carbon atoms. A desirable substituent is an alkyl group of 12 to 18 aliphatic carbon atoms such as dodecyl, pentadecyl or octadecyl or an alkoxy group with 8 to 18 aliphatic carbon atoms such as dodecyloxy and hexadecyloxy or a halogen such as a meta or para chloro group, carboxy, or sulfonamido. Any such groups may contain interrupting heteroatoms such as oxygen to form e.g. polyalkylene oxides.

In formulas (I) or (IA), Z is a hydrogen atom or a group which can be split off by the reaction of the coupler with an oxidized color developing agent, known in the photographic art as a 'coupling-off group' and may preferably be hydrogen, chloro, fluoro, substituted aryloxy or mercaptotetrazole, more preferably hydrogen or chloro.

The presence or absence of such groups determines the chemical equivalency of the coupler, i.e., whether it is a 2-equivalent or 4-equivalent coupler, and its particular identity can modify the reactivity of the coupler. Such groups can advantageously affect the layer in which the coupler is coated, or other layers in the photographic recording material, by performing, after release from the coupler, functions such as dye formation, dye hue adjustment, development acceleration or inhibition, bleach acceleration or inhibition, electron transfer facilitation, color correction, and the like.

Representative classes of such coupling-off groups include, for example, halogen, alkoxy, aryloxy, heterocyclyloxy, sulfonyloxy, acyloxy, acyl, heterocyclylsulfonamido, heterocyclylthio, benzothiazolyl, phosophonyloxy, alkylthio, arylthio, and arylazo. These coupling-off groups are described in the art, for example, in U.S. Pat. Nos. 2,455,169; 3,227,551; 3,432,521; 3,467,563; 3,617,291; 3,880,661; 4,052,212; and 4,134,766; and in U.K. Patent Nos. and published applications 1,466,728; 1,531,927; 1,533,039; 2,066,755A, and 2,017,704A. Halogen, alkoxy, and aryloxy groups are most suitable.

Examples of specific coupling-off groups are —Cl, —F, —Br, —SCN, —OCH$_3$, —OC$_6$H$_5$, —OCH$_2$C(=O)NHCH$_2$CH$_2$OH, —OCH$_2$C(O)NHCH$_2$CH$_2$OCH$_3$, —OCH$_2$C(O)NHCH$_2$CH$_2$OC(=O)OCH$_3$, —P(=O)(OC$_2$H$_5$)$_2$, —SCH$_2$CH$_2$COOH,

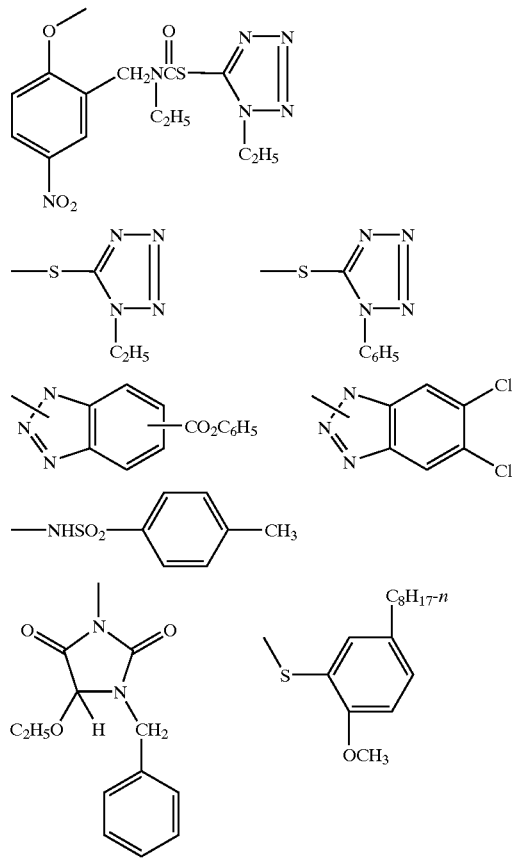

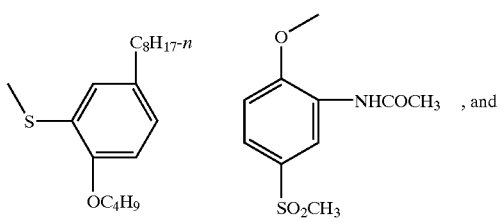

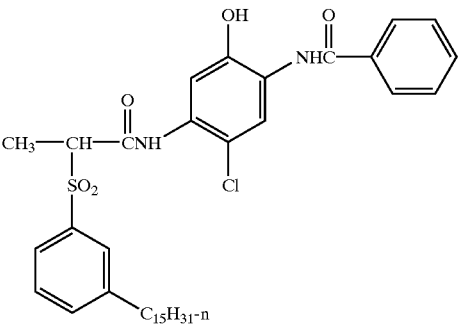

Typically, the coupling-off group is a chlorine atom, hydrogen atom or p-methoxyphenoxy group.

It is essential that the substituent groups be selected so as to adequately ballast the coupler and the resulting dye in the organic solvent in which the coupler is dispersed. The ballasting may be accomplished by providing hydrophobic substituent groups in one or more of the substituent groups. Generally a ballast group is an organic radical of such size and configuration as to confer on the coupler molecule sufficient bulk and aqueous insolubility as to render the coupler substantially nondiffusible from the layer in which it is coated in a photographic element. Thus, the combination of substituent are suitably chosen to meet these criteria. To be effective, the ballast will usually contain at least 8 carbon atoms and typically contains 10 to 30 carbon atoms. Suitable ballasting may also be accomplished by providing a plurality of groups which in combination meet these criteria. In the preferred embodiments of the invention $R_1$ in formula (1) is a small alkyl group or hydrogen. Therefore, in these embodiments the ballast would be primarily located as part of the other groups. Furthermore, even if the coupling-off group Z contains a ballast, it is often necessary to ballast the other substituents as well, since Z is eliminated from the molecule upon coupling; thus, the ballast is most advantageously provided as part of groups other than Z.

The following examples further illustrate preferred coupler of the invention. It is not to be construed that the present invention is limited to these examples.

IC-6
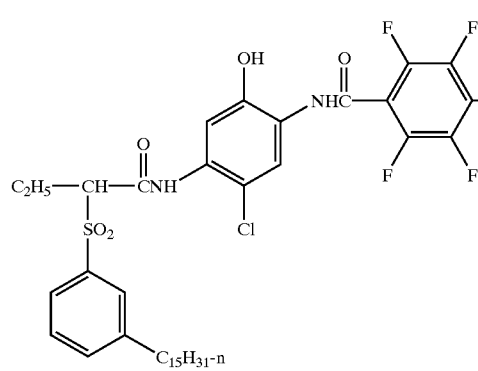
IC-7
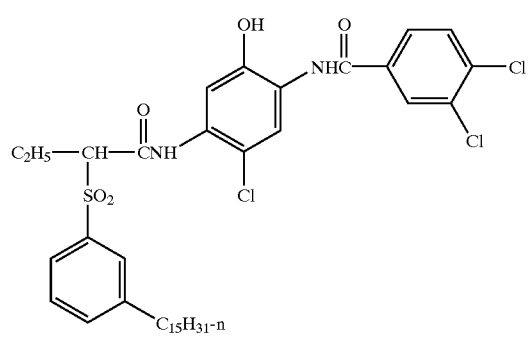
IC-8
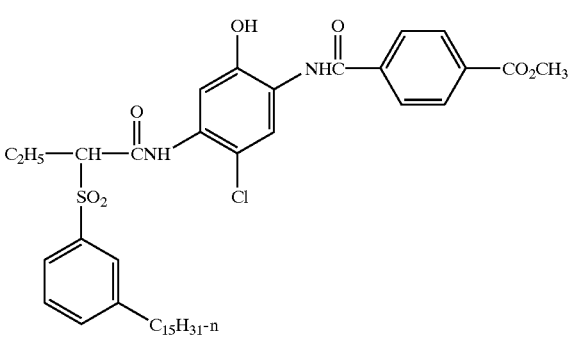
IC-9
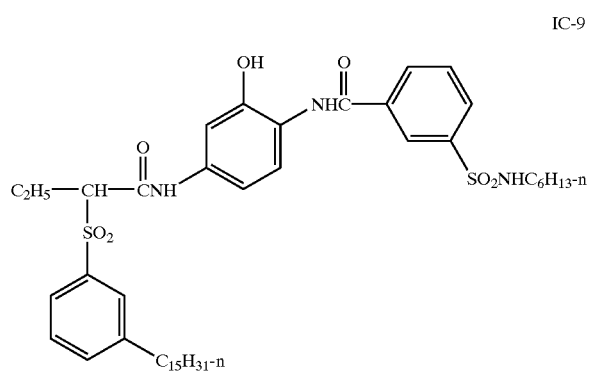
IC-10
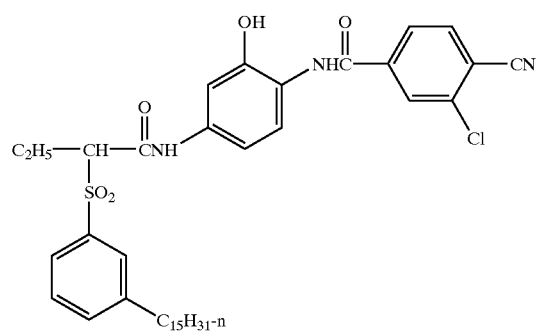
IC-11
IC-12
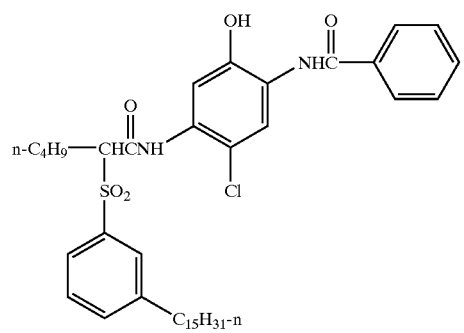
IC-13

-continued
IC-14
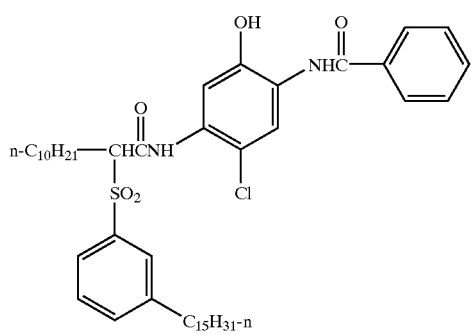
IC-18
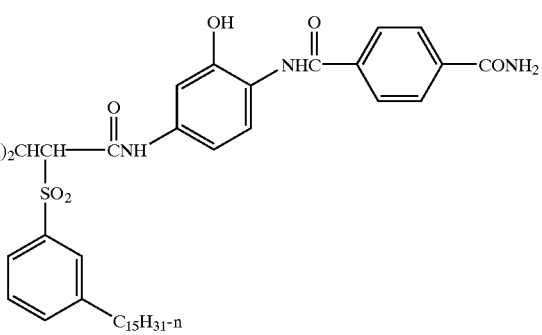
IC-15
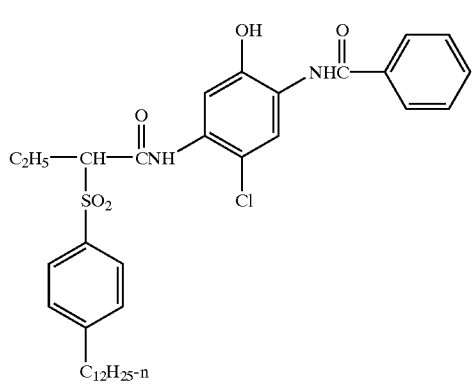
IC-19
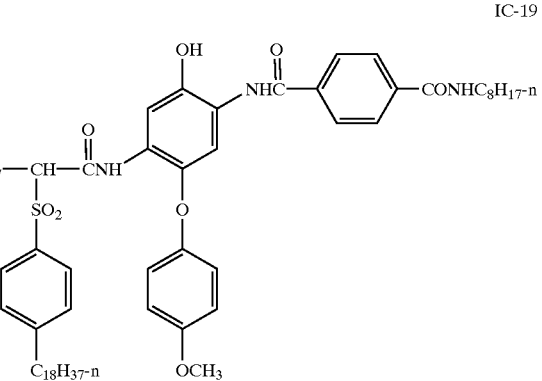
IC-16
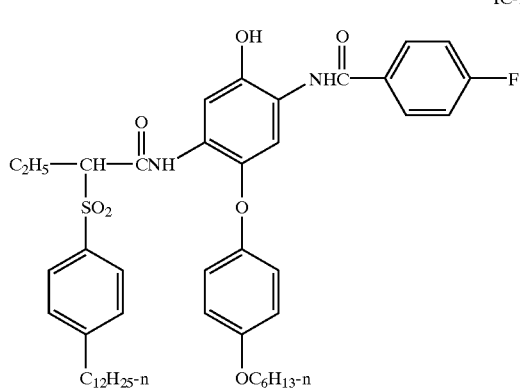
IC-20
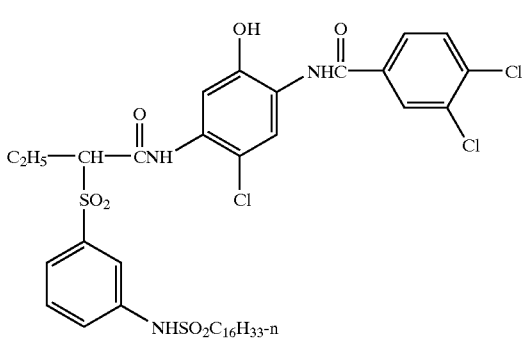
IC-17
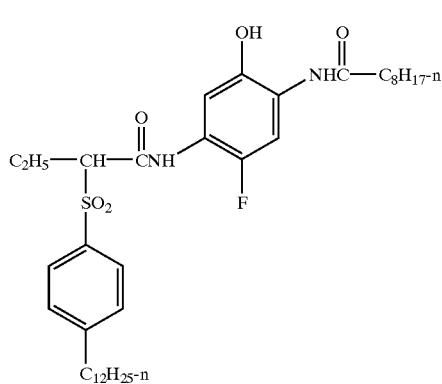
IC-21
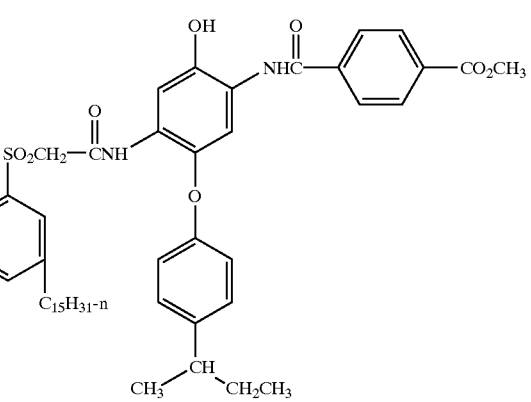

-continued
IC-22
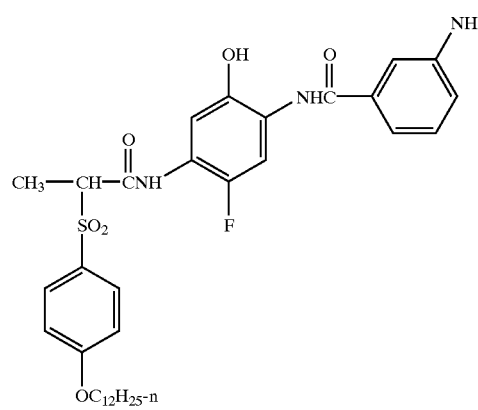
IC-23
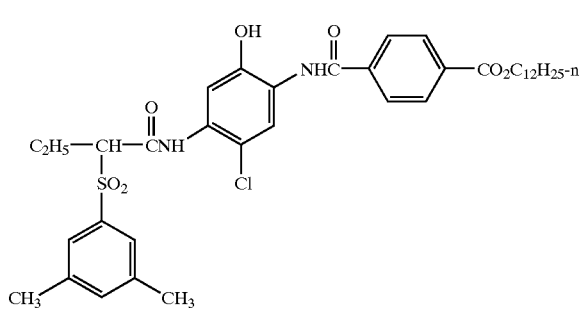
IC-24
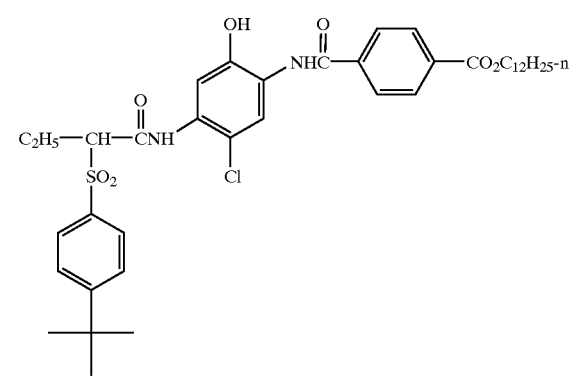
IC-25
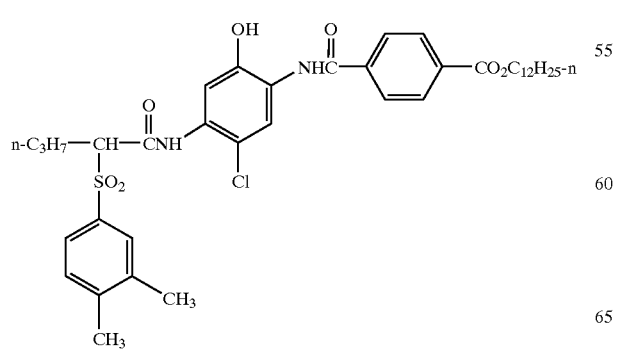
-continued
IC-26
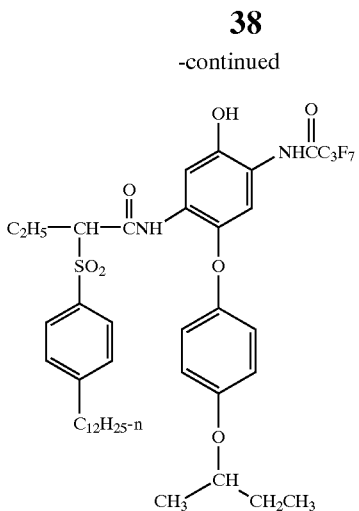
IC-27
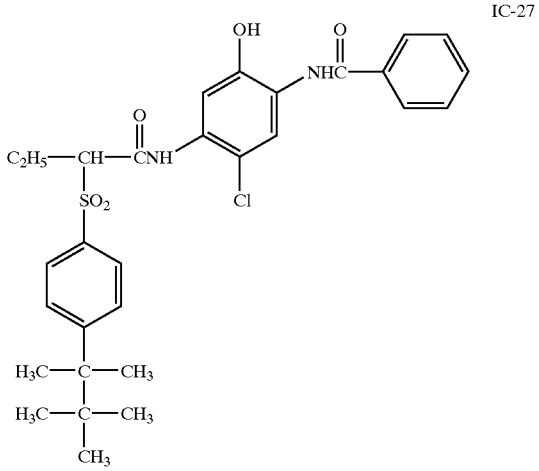
IC-28
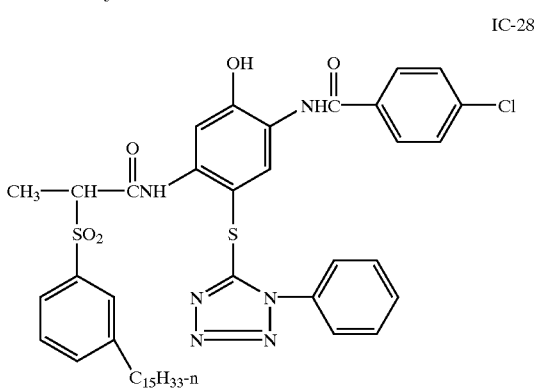
IC-29
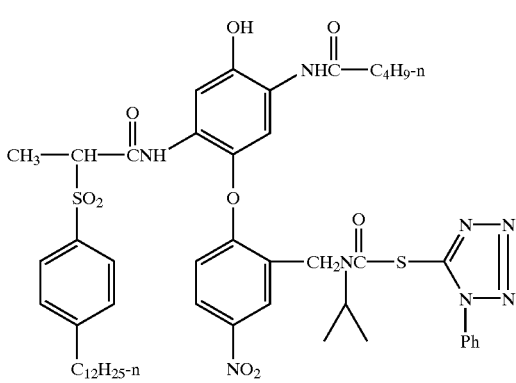

IC-30
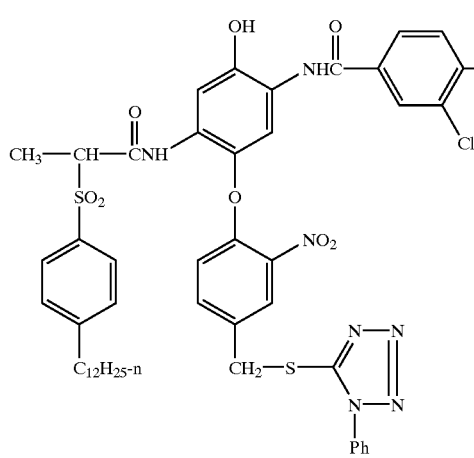
IC-31
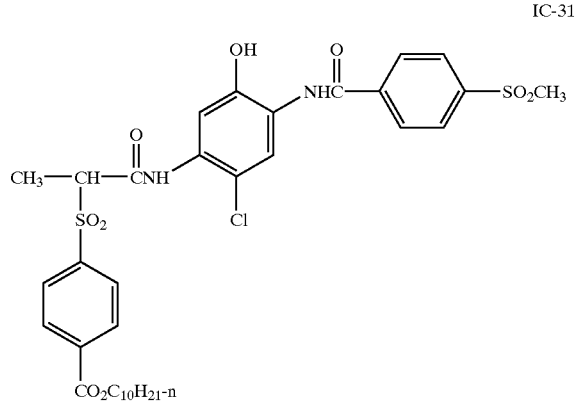
IC-32
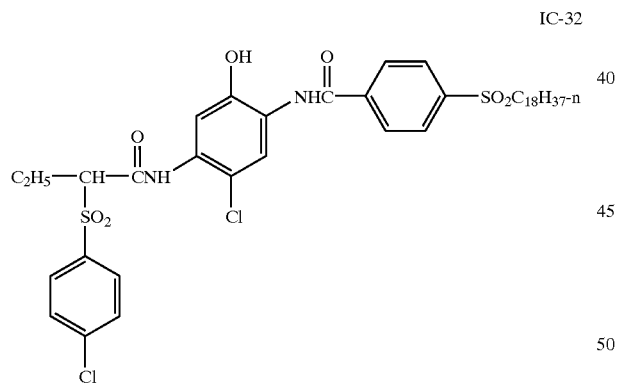
IC-33
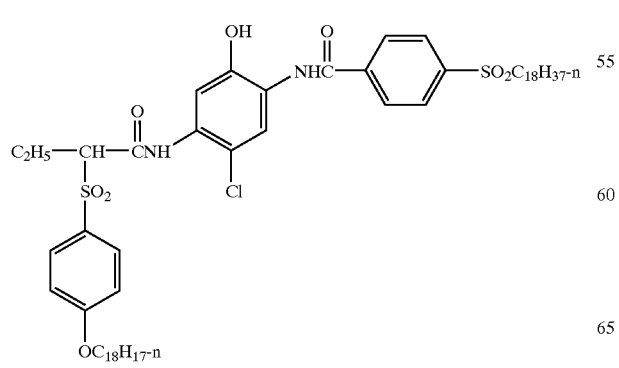
IC-34
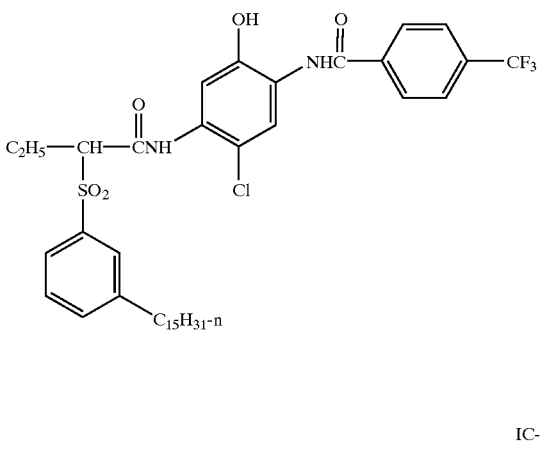
IC-35
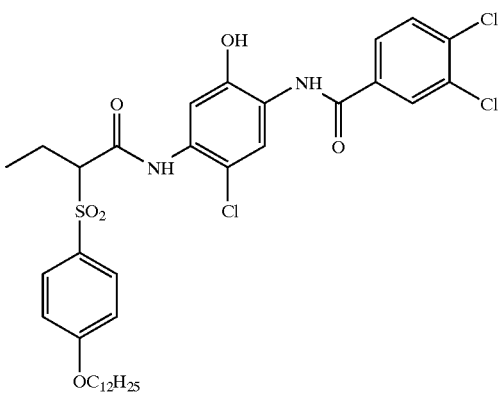
IC-36
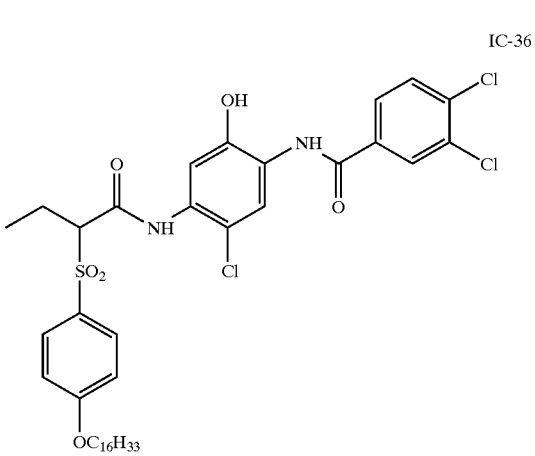
IC-37
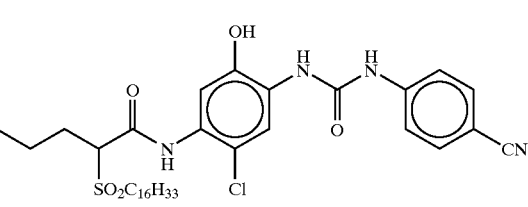

-continued

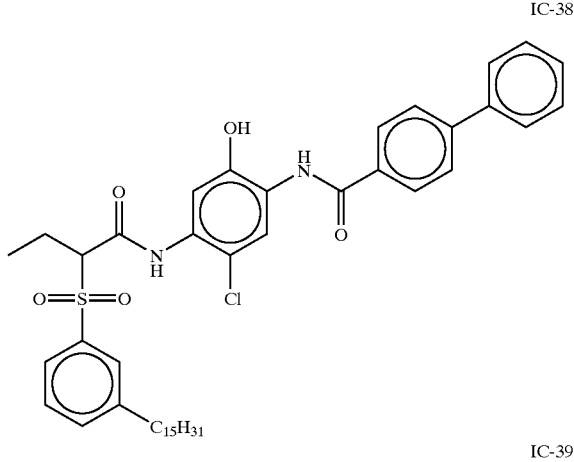

IC-38

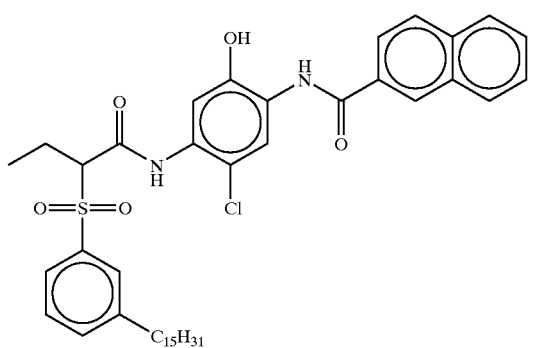

IC-39

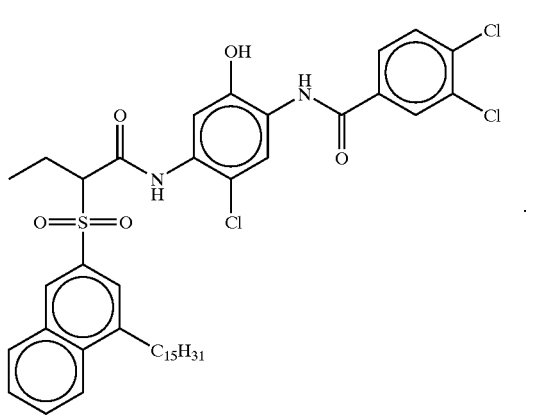

IC-40

Preferred couplers are IC-3, IC-7, IC-35, and IC-36 because of their suitably narrow left bandwidths.

Couplers that form magenta dyes upon reaction with oxidized color developing agent are described in such representative patents and publications as: U.S. Pat. Nos. 2,311,082; 2,343,703; 2,369,489; 2,600,788; 2,908,573; 3,062,653; 3,152,896; 3,519,429; 3,758,309; and "Farbkuppler-eine Literature Ubersicht," published in Agfa Mitteilungen, Band III, pp. 126–156 (1961). Preferably such couplers are pyrazolones, pyrazolotriazoles, or pyrazolobenzimidazoles that form magenta dyes upon reaction with oxidized color developing agents. Especially preferred couplers are 1H-pyrazolo [5,1-c]-1,2,4-triazole and 1H-pyrazolo [1,5-b]-1,2,4-triazole. Examples of 1H-pyrazolo [5,1 -c]-1,2,4-triazole couplers are described in U.K. Patent Nos. 1,247,493; 1,252,418; 1,398,979; U.S. Pat. Nos. 4,443,536; 4,514,490; 4,540,654; 4,590,153; 4,665,015; 4,822,730; 4,945,034; 5,017,465; and 5,023,170. Examples of 1H-pyrazolo [1,5-b]-1,2,4-triazoles can be found in European Patent applications 176,804; 177,765; U.S. Pat. Nos. 4,659,652; 5,066,575; and 5,250,400.

Typical pyrazoloazole and pyrazolone couplers are represented by the following formulas:

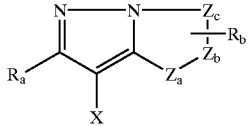

MAGENTA-1

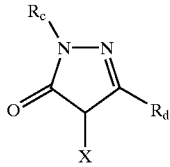

MAGENTA-2 wherein $R_a$ and $R_b$ independently represents H or a substituent; $R_c$ is a substituent (preferably an aryl group); $R_d$ is a substituent (preferably an anilino, carbonamido, ureido, carbamoyl, alkoxy, aryloxycarbonyl, alkoxycarbonyl, or N-heterocyclic group); X is hydrogen or a coupling-off group; and $Z_a$, $Z_b$, and $Z_c$ is independently a substituted methine group, =N—, =C—, or —NH—, provided that one of either the $Za$–$Zb$ bond or the $Zb$–$Zc$ bond is a double bond and the other is a single bond, and when the $Zb$–$Zc$ bond is a carbon-carbon double bond, it may form part of an aromatic ring, and at least one of $Za$, $Zb$, and $Zc$ represents a methine group connected to the group $Rb$.

Specific examples of such couplers are:

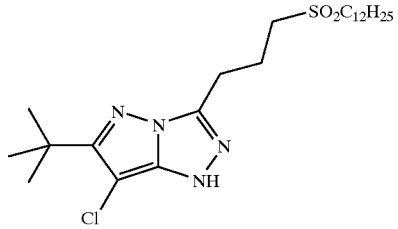

M-1

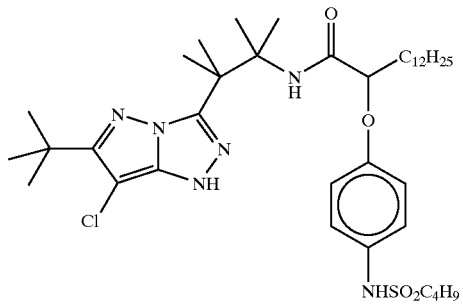

M-2

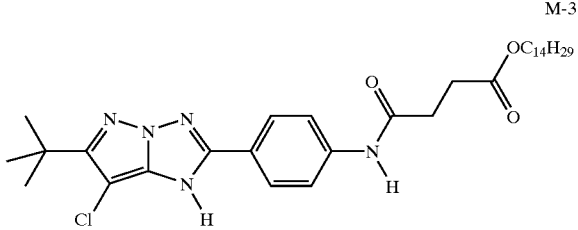

M-3

-continued

M-4

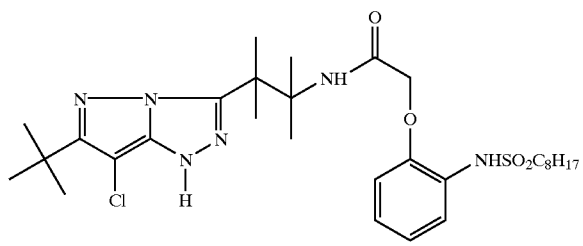

M-5

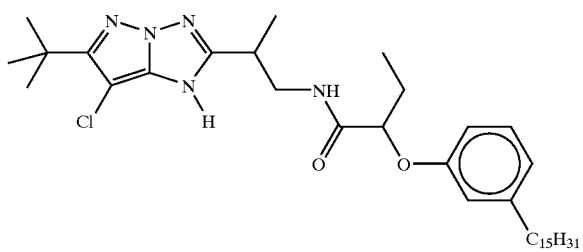

Couplers that form yellow dyes upon reaction with oxidized color developing agent are described in such representative patents and publications as: U.S. Pat. Nos. 2,298,443; 2,407,210; 2,875,057; 3,048,194; 3,265,506; 3,447,928; 3,960,570; 4,022,620; 4,443,536; 4,910,126; and 5,340,703 and "Farbkuppler-eine Literature Ubersicht," published in Agfa Mitteilungen, Band III, pp. 112–126 (1961). Such couplers are typically open chain ketomethylene compounds. Also preferred are yellow couplers such as described in, for example, European Patent Application Nos. 482,552; 510,535; 524,540; 543,367; and U.S. Pat. No. 5,238,803. For improved color reproduction, couplers which give yellow dyes that cut off sharply on the long wavelength side are particularly preferred (for example, see U.S. Pat. No. 5,360,713).

Typical preferred yellow couplers are represented by the following formulas:

YELLOW-1

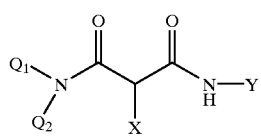

YELLOW-2

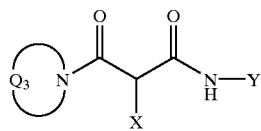

YELLOW-3

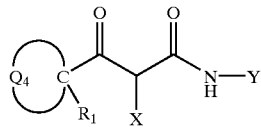

YELLOW-4

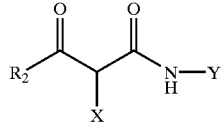

wherein $R_1$, $R_2$, $Q_1$ and $Q_2$ each represents a substituent; X is hydrogen or a coupling-off group; Y represents an aryl group or a heterocyclic group; $Q_3$ represents an organic residue required to form a nitrogen-containing heterocyclic group together with the >N—; and Q4 represents nonmetallic atoms necessary to from a 3- to 5-membered hydrocarbon ring or a 3- to 5-membered heterocyclic ring which contains at least one hetero atom selected from N, O, S, and P in the ring. Particularly preferred is when $Q_1$ and $Q_2$ each represent an alkyl group, an aryl group, or a heterocyclic group, and $R_2$ represents an aryl or tertiary alkyl group.

Preferred yellow couplers can be of the following general structures:

Y-1

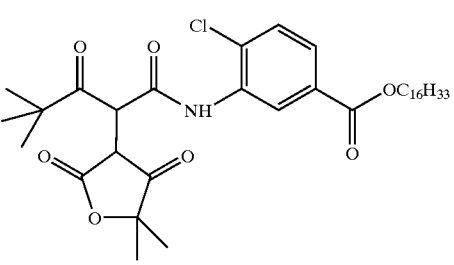

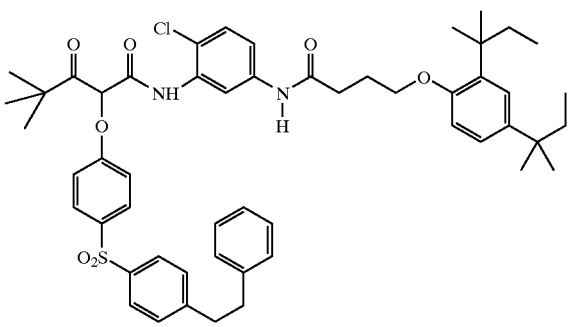

Y-3

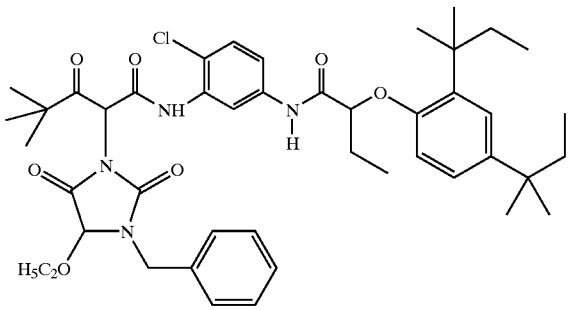

Y-4

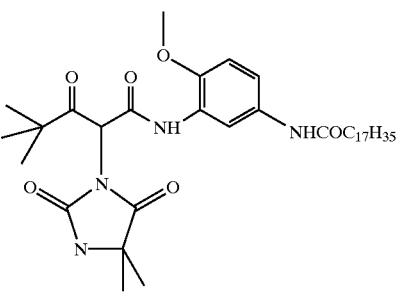

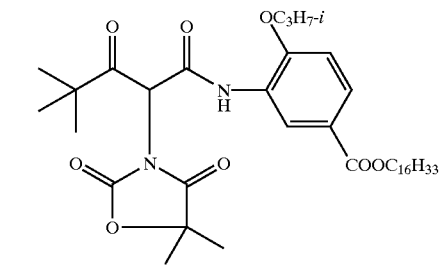

Y-5

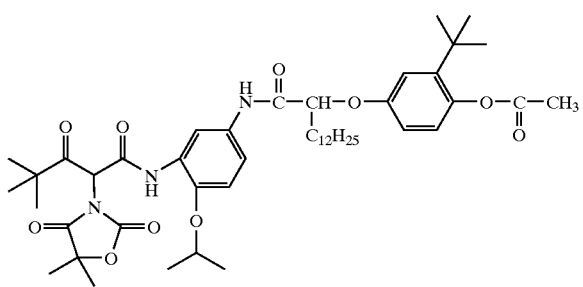

Y-6

Unless otherwise specifically stated, substituent groups which may be substituted on molecules herein include any groups, whether substituted or unsubstituted, which do not destroy properties necessary for photographic utility. When the term "group" is applied to the identification of a substituent containing a substitutable hydrogen, it is intended to encompass not only the substituent's unsubstituted form, but also its form further substituted with any group or groups as herein mentioned. Suitably, the group may be halogen or may be bonded to the remainder of the molecule by an atom of carbon, silicon, oxygen, nitrogen, phosphorous, or sulfur. The substituent may be, for example, halogen, such as chlorine, bromine or fluorine; nitro; hydroxyl; cyano; carboxyl; or groups which may be further substituted, such as alkyl, including straight or branched chain alkyl, such as methyl, trifluoromethyl, ethyl, t-butyl, 3-(2,4-di-t-pentylphenoxy) propyl, and tetradecyl; alkenyl, such as ethylene, 2-butene; alkoxy, such as methoxy, ethoxy, propoxy, butoxy, 2-methoxyethoxy, sec-butoxy, hexyloxy, 2-ethylhexyloxy, tetradecyloxy, 2-(2,4-di-t-pentylphenoxy) ethoxy, and 2-dodecyloxyethoxy; aryl such as phenyl, 4-t-butylphenyl, 2,4,6-trimethylphenyl, naphthyl; aryloxy, such as phenoxy, 2-methylphenoxy, alpha- or beta- naphthyloxy, and 4-tolyloxy; carbonamido, such as acetamido, benzamido, butyramido, tetradecanamido, alpha-(2,4-di-t-pentyl-phenoxy)acetamido, alpha-(2,4-di-t-pentylphenoxy) butyramido, alpha-(3-pentadecylphenoxy)-hexanamido, alpha-( 4-hydroxy-3-t-butylphenoxy)-tetradecanamido, 2-oxo-pyrrolidin-1-yl, 2-oxo-5-tetradecylpyrrolin-1 -yl, N-methyltetradecanamido, N-succinimido, N-phthalimido, 2,5-dioxo-1-oxazolidinyl, 3-dodecyl-2,5-dioxo-1-imidazolyl, and N-acetyl-N-dodecylamino, ethoxycarbonylamino, phenoxycarbonylamino, benzyloxycarbonylamino, hexadecyloxycarbonylamino, 2,4-di-t-butylphenoxycarbonylamino, phenylcarbonylamino, 2,5-(di-t-pentylphenyl) carbonylamino, p-dodecyl-phenylcarbonylamino, p-toluylcarbonylamino, N-methylureido, N,N-dimethylureido, N-methyl-N-dodecylureido, N-hexadecylureido, N,N-dioctadecylureido, N,N-dioctyl-N'-ethylureido, N-phenylureido, N,N-diphenylureido, N-phenyl-N-p-toluylureido, N-(m-hexadecylphenyl)ureido, N,N-(2,5-di-t-pentylphenyl)-N'-ethylureido, and t-butylcarbonamido; sulfonamido, such as methylsulfonamido, benzenesulfonamido, p-toluylsulfonamido, p-dodecylbenzenesulfonamido, N-methyltetradecylsulfonamido, N,N-dipropyl-sulfamoylamino, and hexadecylsulfonamido; sulfamoyl, such as N-methylsulfamoyl, N-ethylsulfamoyl, N,N-dipropylsulfamoyl, N-hexadecylsulfamoyl, N,N-dimethylsulfamoyl; N-[3-(dodecyloxy)propyl]sulfamoyl, N-[4-(2,4-di-t-pentylphenoxy)butyl]sulfamoyl, N-methyl-N-tetradecylsulfamoyl, and N-dodecylsulfamoyl; carbamoyl, such as N-methylcarbamoyl, N,N-dibutylcarbamoyl, N-octadecylcarbamoyl, N-[4-(2,4-di-t-pentylphenoxy)butyl]carbamoyl, N-methyl-N-tetradecylcarbamoyl, and N,N-dioctylcarbamoyl; acyl, such as acetyl, (2,4-di-t-amylphenoxy)acetyl, phenoxycarbonyl, p-dodecyloxyphenoxycarbonyl, methoxycarbonyl, butoxycarbonyl, tetradecyloxycarbonyl, ethoxycarbonyl, benzyloxycarbonyl, 3-pentadecyloxycarbonyl, and dodecyloxycarbonyl; sulfonyl, such as methoxysulfonyl, octyloxysulfonyl, tetradecyloxysulfonyl, 2-ethylhexyloxysulfonyl, phenoxysulfonyl, 2,4-di-t-pentylphenoxysulfonyl, methylsulfonyl, octylsulfonyl, 2-ethylhexylsulfonyl, dodecylsulfonyl, hexadecylsulfonyl, phenylsulfonyl, 4-nonylphenylsulfonyl, and p-toluylsulfonyl; sulfonyloxy, such as dodecylsulfonyloxy, and hexadecylsulfonyloxy; sulfinyl, such as methylsulfinyl, octylsulfinyl, 2-ethylhexylsulfinyl, dodecylsulfinyl, hexadecylsulfinyl, phenylsulfinyl, 4-nonylphenylsulfinyl, and p-toluylsulfinyl; thio. such as ethylthio, octylthio, benzylthio, tetradecylthio, 2-(2,4-di-t-pentylphenoxy) ethylthio, phenylthio, 2-butoxy-5-t-octylphenylthio, and p-tolylthio; acyloxy, such as acetyloxy, benzoyloxy, octadecanoyloxy, p-dodecylamidobenzoyloxy, N-phenylcarbamoyloxy, N-ethylcarbamoyloxy, and cyclohexylcarbonyloxy; amino, such as phenylanilino, 2-chloroanilino, diethylamino, dodecylamino; imino, such as 1 (N-phenylimido)ethyl, N-succinimido or 3-benzylhydantoinyl; phosphate, such as dimethylphosphate and ethylbutylphosphate; phosphite, such as diethyl and dihexylphosphite; a heterocyclic group, a heterocyclic oxy group or a heterocyclic thio group, each of which may be substituted and which contain a 3 to 7 membered heterocyclic ring composed of carbon atoms and at least one hetero atom selected from the group consisting of oxygen, nitrogen and sulfur, such as 2-furyl, 2-thienyl, 2-benzimidazolyloxy or 2-benzothiazolyl; quaternary ammonium, such as triethylammonium; and silyloxy, such as trimethylsilyloxy.

If desired, the substituents may themselves be further substituted one or more times with the described substituent groups. The particular substituents used may be selected by those skilled in the art to attain the desired photographic properties for a specific application and can include, for example, hydrophobic groups, solubilizing groups, blocking groups, releasing or releasable groups, etc. Generally, the above groups and substituents thereof may include those having up to 48 carbon atoms, typically 1 to 36 carbon atoms and usually less than 24 carbon atoms, but greater numbers are possible depending on the particular substituents selected.

Representative substituents on ballast groups include alkyl, aryl, alkoxy, aryloxy, alkylthio, hydroxy, halogen, alkoxycarbonyl, aryloxcarbonyl, carboxy, acyl, acyloxy, amino, anilino, carbonamido, carbamoyl, alkylsulfonyl, arylsulfonyl, sulfonamido, and sulfamoyl groups wherein the substituents typically contain 1 to 42 carbon atoms. Such substituents can also be further substituted.

Stabilizers and scavengers that can be used in these photographic elements, but are not limited to, the following.
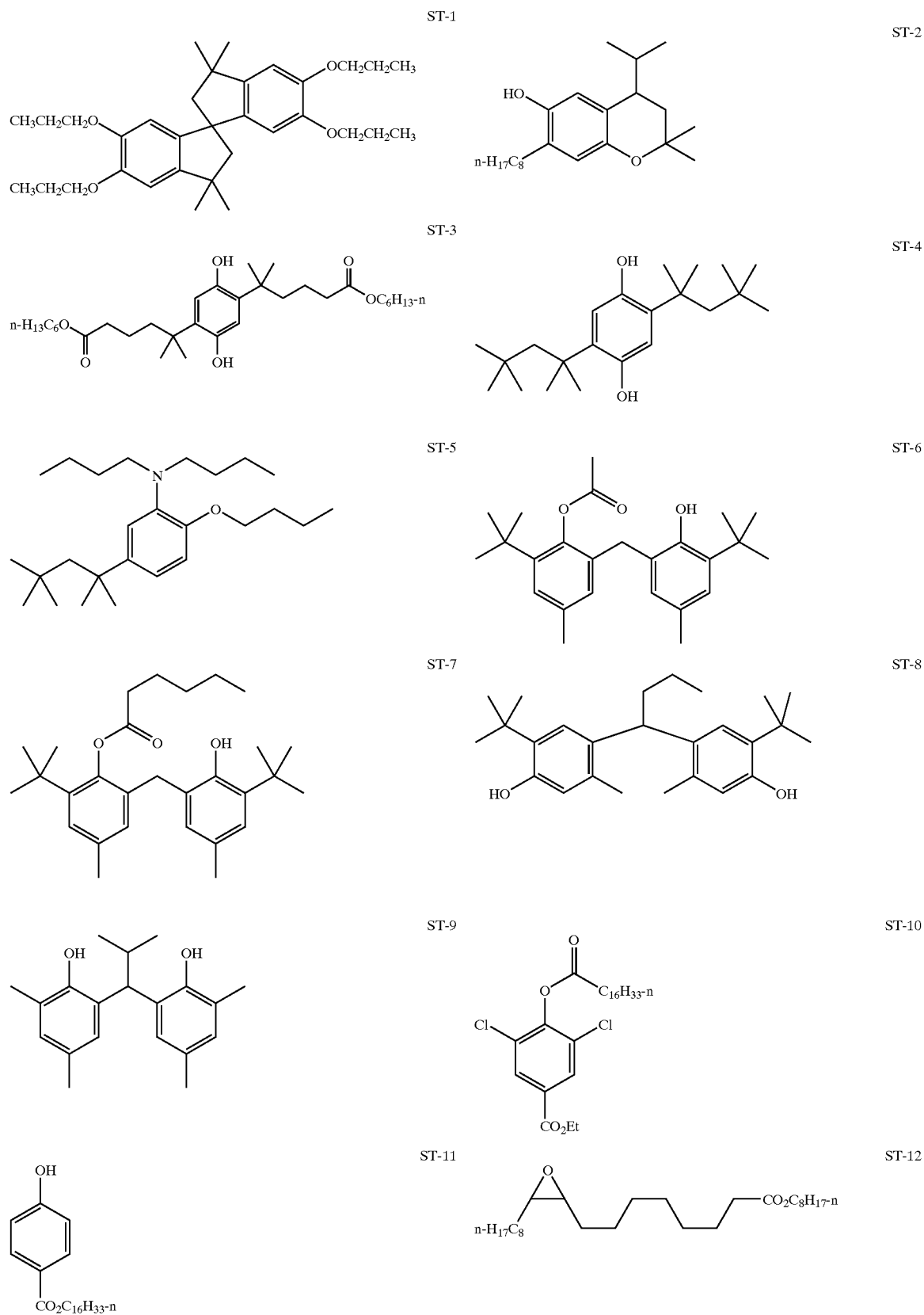

ST-13 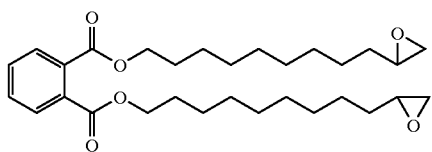
ST-14 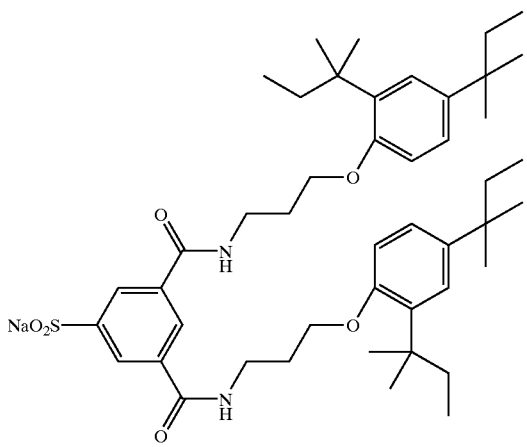
ST-15 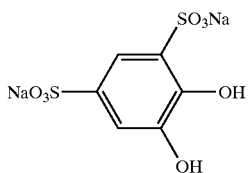
ST-16 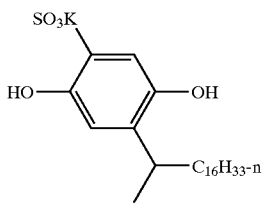
ST-17 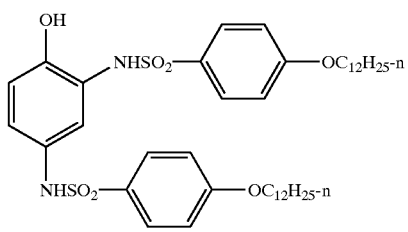
ST-18 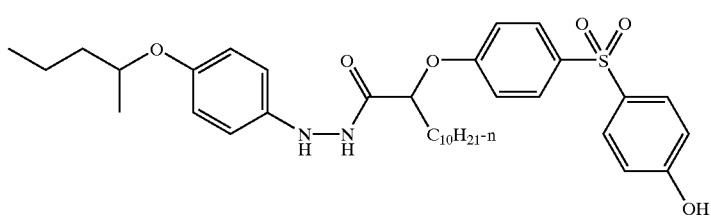
ST-19 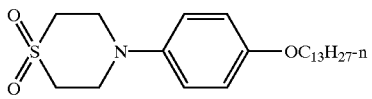
ST-20 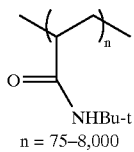
n = 75–8,000
ST-21 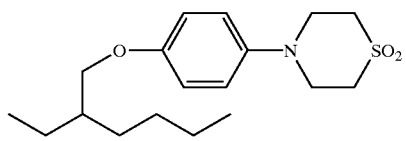
ST-22 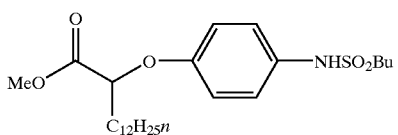
ST-23 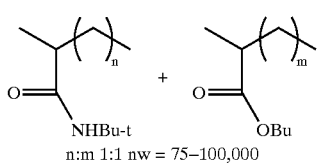
n:m 1:1 nw = 75–100,000

ST-24

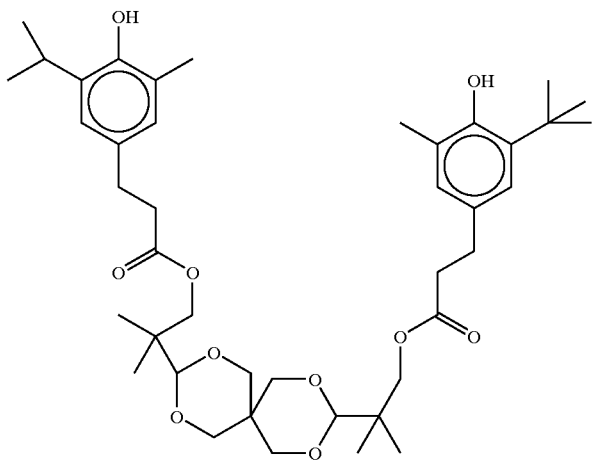

Examples of solvents which may be used in the invention include the following:

| | |
|---|---|
| Tritolyl phosphate | S-1 |
| Dibutyl phthalate | S-2 |
| Diundecyl phthalate | S-3 |
| N,N-Diethyldodecanamide | S-4 |
| N,N-Dibutyldodecanamide | S-5 |
| Tris(2-ethylhexyl)phosphate | S-6 |
| Acetyl tributyl citrate | S-7 |
| 2,4-Di-tert-pentylphenol | S-8 |
| 2-(2-Butoxyethoxy)ethyl acetate | S-9 |
| 1,4-Cyclohexyldimethylene bis(2-ethylhexanoate) | S-10 |

The dispersions used in photographic elements may also include ultraviolet (UV) stabilizers and so-called liquid UV stabilizers such as described in U.S. Pat. Nos. 4,992,358; 4,975,360; and 4,587,346. Examples of UV stabilizers are shown below.

UV-1

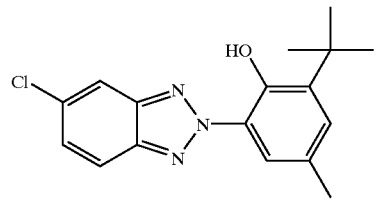

UV-2

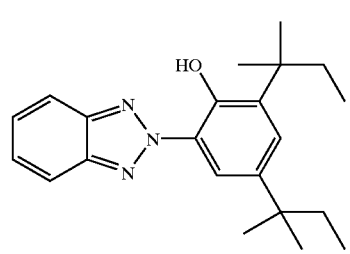

UV-3

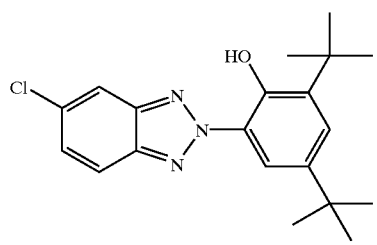

UV-4

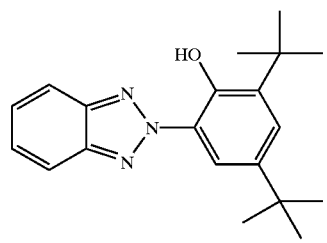

UV-5

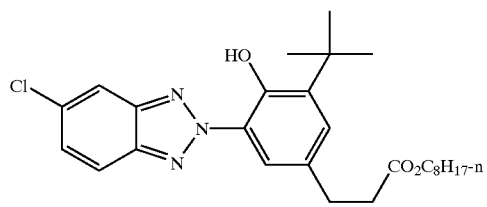

UV-6

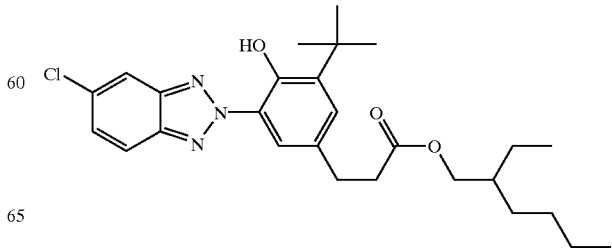

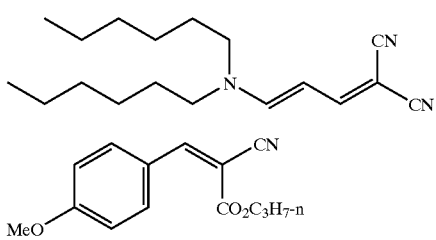
UV-7

UV-8

The aqueous phase may include surfactants. Surfactants may be cationic, anionic, zwitterionic or non-ionic. Useful surfactants include, but are not limited to, the following:

SF-1

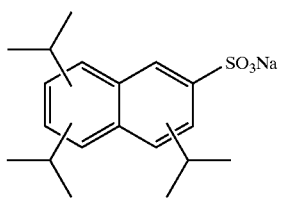

CF₃•(CF₂)₇•SO₃Na

SF-2

CH₃•(CH₂)ₙ•SO₃Na, n = 12–14

SF-3

SF-4

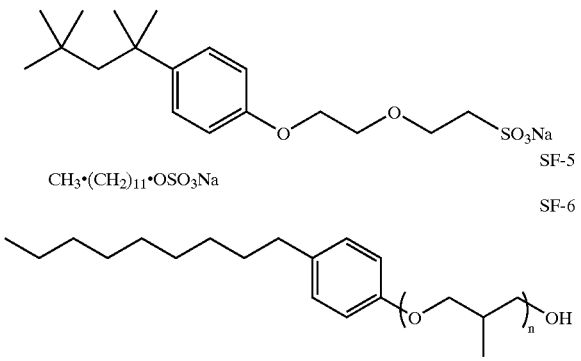

CH₃•(CH₂)₁₁•OSO₃Na

SF-5

SF-6

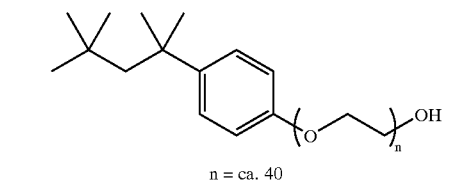

SF-7

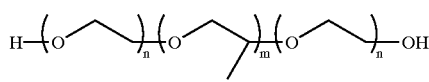

n = ca. 40

SF-8

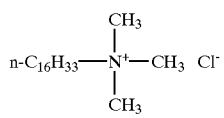

n = ca. 6, m = ca. 2

SF-9

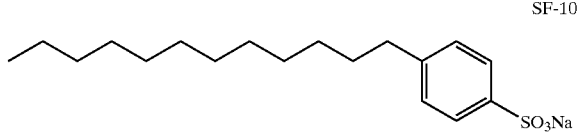

SF-10

SF-11

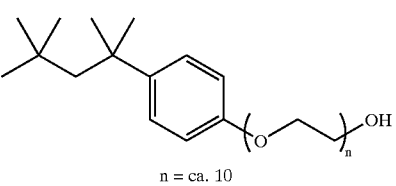

n = ca. 10

SF-12

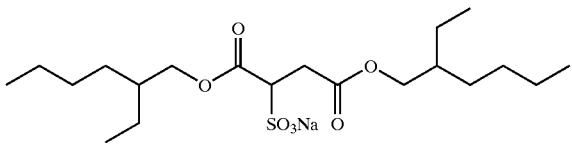

Further, it is contemplated to stabilize photographic dispersions prone to particle growth through the use of hydrophobic, photographically inert compounds such as disclosed by Zengerle et al U.S. Pat. No. 5,468,604.

In a preferred embodiment the invention employs recording elements which are constructed to contain at least three silver halide emulsion layer units. A suitable full color, multilayer format for a recording element used in the invention is represented by Structure I.

---

Red-sensitized
    cyan dye image-forming silver halide emulsion unit
    Interlayer
Green-sensitized
    magenta dye image-forming silver halide emulsion unit
    Interlayer
Blue-sensitized
    yellow dye image-forming silver halide emulsion unit
    ///// Support /////
Blue-sensitized
    yellow dye image-forming silver halide emulsion unit
    Interlayer
Green-sensitized
    magenta dye image-forming silver halide emulsion unit
    Interlayer
Red-sensitized
    cyan dye image-forming silver halide emulsion unit

---

Structure I wherein the red-sensitized, cyan dye image-forming silver halide emulsion unit is situated nearest the support; next in order is the green-sensitized, magenta dye image-forming unit, followed by the uppermost blue-sensitized, yellow dye image-forming unit. The image-forming units are separated from each other by hydrophilic colloid interlayers containing an oxidized developing agent scavenger to prevent color contamination. Silver halide emulsions satisfying the grain and gelatino-peptizer requirements described above can be present in any one or combination of the emulsion layer units. Additional useful multicolor, multilayer formats for an element of the invention include structures as described in U.S. Pat. No. 5,783,373. Each of such structures in accordance with the invention preferably would contain at least three silver halide emulsions comprised of high chloride grains having at least 50 percent of their surface area bounded by {100} crystal. faces and containing dopants from classes (i) and (ii), as described above. Preferably, each of the emulsion layer units contains emulsion satisfying these criteria.

Conventional features that can be incorporated into multilayer (and particularly multicolor) recording elements contemplated for use in the method of the invention are illustrated by Research Disclosure, Item 38957, cited above:

XI. Layers and layer arrangements

XII. Features applicable only to color negative

XIII. Features applicable only to color positive B. Color reversal C. Color positives derived from color negatives XIV. Scan facilitating features.

The recording elements comprising the radiation sensitive high chloride emulsion layers according to this invention can be conventionally optically printed, or in accordance with a particular embodiment of the invention can be image-wise exposed in a pixel-by-pixel mode using suitable high energy radiation sources typically employed in electronic printing methods. Suitable actinic forms of energy encompass the ultraviolet, visible and infrared regions of the electromagnetic spectrum as well as electron-beam radiation and is conveniently supplied by beams from one or more light emitting diodes or lasers, including gaseous or solid state lasers. Exposures can be monochromatic, orthochromatic or panchromatic. For example, when the recording element is a multilayer multicolor element, exposure can be provided by laser or light emitting diode. beams of appropriate spectral radiation, for example, infrared, red, green or blue wavelengths, to which such element is sensitive. Multicolor elements can be employed which produce cyan, magenta and yellow dyes as a function of exposure in separate portions of the electromagnetic spectrum, including at least two portions of the infrared region, as disclosed in the previously mentioned U.S. Pat. No. 4,619,892. Suitable exposures include those up to 2000 nm, preferably up to 1500 nm. Suitable light emitting diodes and commercially available laser sources are known and commercially available. Imagewise exposures at ambient, elevated or reduced temperatures and/or pressures can be employed within the useful response range of the recording element determined by conventional sensitometric techniques, as illustrated by T. H. James, *The Theory of the Photographic Process*, 4th Ed., Macmillan, 1977, Chapters 4, 6, 17, 18, and 23.

It has been observed that anionic [$MX_xY_yL_z$] hexacoordination complexes, where M is a group 8 or 9 metal (preferably iron, ruthenium or iridium), X is halide or pseudohalide (preferably Cl, Br or CN) x is 3 to 5, Y is $H_2O$, y is 0 or 1, L is a C—C, H—C or C—N—H organic ligand, and Z is 1 or 2, are surprisingly effective in reducing high intensity reciprocity failure (HIRF), low intensity reciprocity failure (LIRF) and thermal sensitivity variance and in in improving latent image keeping (LIK). As herein employed, HIRF is a measure of the variance of photographic properties for equal exposures, but with exposure times ranging from $10^{-1}$ to $10^{-6}$ second. LIRF is a measure of the variance of photographic properties for equal exposures, but with exposure times ranging from $10^{-1}$ to 100 seconds. Although these advantages can be generally compatible with face centered cubic lattice grain structures, the most striking improvements have been observed in high (>50 mole %, preferably $\geq$90 mole %) chloride emulsions. Preferred C—C, H—C or C—N—H organic ligands are aromatic heterocycles of the type described in U.S. Pat. No. 5,462, 849. The most effective C—C, H—C or C—N—H organic ligands are azoles and azines, either unsustituted or containing alkyl, alkoxy, or halide substituents, where the alkyl moieties contain from 1 to 8 carbon atoms. Particularly preferred azoles and azines include thiazoles, thiazolines and pyrazines.

The quantity or level of high energy actinic radiation provided to the recording medium by the exposure source is generally at least $10^{-4}$ ergs/cm$^2$, typically in the range of about $10^{-4}$ ergs/cm$^2$ to $10^{-3}$ ergs/cm$^2$ and often from $10^{-3}$ ergs/cm$^2$ to $10^2$ ergs/cm$^2$. Exposure of the recording element in a pixel-by-pixel mode as known in the prior art persists for only a very short duration or time. Typical maximum exposure times are up to 100$\mu$ seconds, often up to 10$\mu$ seconds, and frequently up to only 0.5$\mu$ seconds. Single or multiple exposures of each pixel are contemplated. The pixel density is subject to wide variation, as is obvious to those skilled in the art. The higher the pixel density, the sharper the images can be, but at the expense of equipment complexity. In general, pixel densities used in conventional electronic printing methods of the type described herein do not exceed $10^7$ pixels/cm$^2$ and are typically in the range of about $10^4$ to $10^6$ pixels/cm$^2$. An assessment of the technology of high-quality, continuous-tone, color electronic printing using silver halide photographic paper which discusses various features and components of the system, including exposure source, exposure time, exposure level and pixel density and other recording element characteristics is provided in Firth et al., *A Continuous-Tone Laser Color Printer*, Journal of Imaging Technology, Vol. 14, No. 3, June 1988. As previously indicated herein, a description of some of the details of conventional electronic printing methods comprising scanning a recording element with high energy beams such as light emitting diodes or laser beams, are set forth in Hioki U.S. Pat. No. 5,126,235 and European Patent Applications 479 167 A1 and 502 508 A1.

Once imagewise exposed, the recording elements can be processed in any convenient conventional manner to obtain a viewable image. Such processing is illustrated by *Research Disclosure*, Item 38957, cited above:

XVIII. Chemical development systems

XIX. Development

XX. Desilvering, washing, rinsing and stabilizing

In addition, a useful developer for the inventive material is a homogeneous, single part developing agent. The homogeneous, single-part color developing concentrate is prepared using a critical sequence of steps:

In the first step, an aqueous solution of a suitable color developing agent is prepared. This color developing agent is generally in the form of a sulfate salt. Other components of the solution can include an antioxidant for the color developing agent, a suitable number of alkali metal ions (in an at least stoichiometric proportion to the sulfate ions; provided by an alkali metal base, and a photographically inactive water-miscible or water-soluble hydroxy-containing organic solvent. This solvent is present in the final concentrate at a concentration such that the weight ratio of water to the organic solvent is from about 15:85 to about 50:50.

In this environment, especially at high alkalinity, alkali metal ions and sulfate ions form a sulfate salt that is precipitated in the presence of the hydroxy-containing organic solvent. The precipitated sulfate salt can then be readily removed using any suitable liquid/solid phase separation technique (including filtration, centrifugation or decantation). If the antioxidant is a liquid organic compound, two phases may be formed and the precipitate may be removed by discarding the aqueous phase.

The color developing concentrates of this invention include one or more color developing agents that are well known in the art that, in oxidized form, will react with dye forming color couplers in the processed materials. Such color developing agents include, but are not limited to, aminophenols, p-phenylenediamines (especially N,N-dialkyl-p-phenylenediamines) and others which are well known in the art, such as EP 0 434 097 A1 (published Jun.

26, 1991) and EP 0 530 921 A1 (published Mar. 10, 1993). It may be useful for the color developing agents to have one or more water-solubilizing groups as are known in the art. Further details of such materials are provided in *Research Disclosure*, publication 38957, pages 592–639 (September 1996). *Research Disclosure* is a publication of Kenneth Mason Publications Ltd., Dudley House, 12 North Street, Emsworth, Hampshire PO10 7DQ England (also available from Emsworth Design Inc., 121 West 19th Street, New York, N.Y. 10011). This reference will be referred to hereinafter as "*Research Disclosure*".

Preferred color developing agents include, but are not limited to, N,N-diethyl p-phenylenediamine sulfate (KODAK Color Developing Agent CD-2), 4-amino-3-methyl-N-(2-methane sulfonamidoethyl)aniline sulfate, 4-(N-ethyl-N-β-hydroxyethylamino)-2-methylaniline sulfate (KODAK Color Developing Agent CD-4), p-hydroxyethylethylaminoaniline sulfate, 4-(N-ethyl-N-2-methanesulfonylaminoethyl)-2-methylphenylenediamine sesquisulfate (KODAK Color Developing Agent CD-3), 4-(N-ethyl-N-2-methanesulfonylaminoethyl)-2-methylphenylenediamine sesquisulfate, and others readily apparent to one skilled in the art.

In order to protect the color developing agents from oxidation, one or more. antioxidants are generally included in the color developing compositions. Either inorganic or organic antioxidants can be used. Many classes of useful antioxidants are known, including but not limited to, sulfites (such as sodium sulfite, potassium sulfite, sodium bisulfite and potassium metabisulfite), hydroxylamine (and derivatives thereof), hydrazines, hydrazides, amino acids, ascorbic acid (and derivatives thereof), hydroxamic acids, aminoketones, mono- and polysaccharides, mono- and polyamines, quaternary ammonium salts, nitroxy radicals, alcohols, and oximes. Also useful as antioxidants are 1,4-cyclohexadiones. Mixtures of compounds from the same or different classes of antioxidants can also be used if desired.

Especially useful antioxidants are hydroxylamine derivatives as described, for example, in U.S. Pat. Nos. 4,892,804; 4,876,174; 5,354,646; and 5,660,974, all noted above, and U.S. Pat. No. 5,646,327 (Burns et al). Many of these antioxidants are mono- and dialkylhydroxylamines having one or more substituents on one or both alkyl groups. Particularly useful alkyl substituents include sulfo, carboxy, amino, sulfonamido, carbonamido, hydroxy, and other solubilizing substituents.

More preferably, the noted hydroxylamine derivatives can be mono- or dialkylhydroxylamines having one or more hydroxy substituents on the one or more alkyl groups. Representative compounds of this type are described, for example, in U.S. Pat. No. 5,709,982 (Marrese et al), as having the structure I:

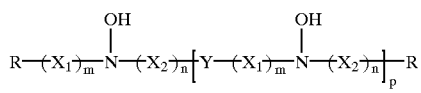

wherein R is hydrogen, a substituted or unsubstituted alkyl group of 1 to 10 carbon atoms, a substituted or unsubstituted hydroxyalkyl group of 1 to 10 carbon atoms, a substituted or unsubstituted cycloalkyl group of 5 to 10 carbon atoms, or a substituted or unsubstituted aryl group having 6 to 10 carbon atoms in the aromatic nucleus.

$X_1$ is $-CR_2(OH)CHR_1-$ and $X_2$ is $-CHR_1CR_2(OH)-$ wherein $R_1$ and $R_2$ are independently hydrogen, hydroxy, a substituted or unsubstituted alkyl group or 1 or 2 carbon atoms, a substituted or unsubstituted hydroxyalkyl group of 1 or 2 carbon atoms, or $R_1$ and $R_2$ together represent the carbon atoms necessary to complete a substituted or unsubstituted 5- to 8-membered saturated or unsaturated carbocyclic ring structure.

Y is a substituted or unsubstituted alkylene group having at least 4 carbon atoms, and has an even number of carbon atoms, or Y is a substituted or unsubstituted divalent aliphatic group having an even total number of carbon and oxygen atoms in the chain, provided that the aliphatic group has a least 4 atoms in the chain.

Also in Structure I, m, n, and p are independently 0 or 1. Preferably, each of m and n is 1, and p is 0.

Specific di-substituted hydroxylamine antioxidants include, but are not limited to, N,N-bis( 2,3-dihydroxypropyl)hydroxylamine, N,N-bis( 2-methyl- 2,3-dihydroxypropyl)hydroxylamine and N,N-bis(1-hydroxymethyl- 2-hydroxy- 3-phenylpropyl) hydroxylamine. The first compound is preferred.

In the following Table, reference will be made to (1) *Research Disclosure*, December 1978, Item 17643, (2) *Research Disclosure*, December 1989, Item 308119, and (3) *Research Disclosure*, September 1994, Item 36544, all published by Kenneth Mason Publications, Ltd., Dudley Annex, 12a North Street, Emsworth, Hampshire PO10 7DQ, ENGLAND. The Table and the references cited in the Table are to be read as describing particular components suitable for use in the elements of the invention. The Table and its cited references also describe suitable ways of preparing, exposing, processing and manipulating the elements, and the images contained therein.

| Reference | Section | Subject Matter |
|---|---|---|
| 1 | I, II | Grain composition, morphology and |
| 2 | I, II, IX, X, XI, XII, XIV, XV | preparation. Emulsion preparation including hardeners, coating aids, addenda, etc. |
| 3 | I, II, III, IX | |
| | A & B | |
| 1 | III, IV | Chemical sensitization and spectral |
| 2 | III, IV | sensitization/Desensitization |
| 3 | IV, V | |
| 1 | V | UV dyes, optical brighteners, |
| 2 | V | luminescent dyes |
| 3 | VI | |
| 1 | VI | Antifoggants and stabilizers |
| 2 | VI | |
| 3 | VII | |
| 1 | VIII | Absorbing and scattering materials; |
| 2 | VIII, XIII, XVI | Antistatic layers; matting agents |
| 3 | VIII, IX C & D | |
| 1 | VII | Image-couplers and image-modifying |
| 2 | VII | couplers; Dye stabilizers and hue |
| 3 | X | modifiers |
| 1 | XVII | Supports |
| 2 | XVII | |
| 3 | XV | |
| 3 | XI | Specific layer arrangements |
| 3 | XII, XIII | Negative working emulsions; Direct positive emulsions |
| 2 | XVIII | Exposure |
| 3 | XVI | |
| 1 | XIX, XX | Chemical processing; |
| 2 | XIX, XX, XXII | Developing agents |
| 3 | XVIII, XIX, XX | |
| 3 | XIV | Scanning and digital processing procedures |

The photographic elements can be exposed with various forms of energy which encompass the ultraviolet, visible, and infrared regions of the electromagnetic spectrum, as well as with electron beam, beta radiation, gamma radiation, x-ray, alpha particle, neutron radiation, and other forms of corpuscular and wave-like radiant energy in either noncoherent (random phase) forms or coherent (in phase) forms, as produced by lasers. When the photographic elements are intended to be exposed by x-rays, they can include features found in conventional radiographic elements.

The preferred imaging element of this invention is a reflective/transmission display material that comprises at least two polymer sheets joined by a solvent based thermoplastic adhesive applied to at least one said at least two polymer sheets between 15 and 50° C. wherein said imaging element further comprises at least one dye forming layer comprising silver halide and dye forming coupler on the opposite side of said transparent polymer sheet from the biaxially oriented polyolefin sheet and said exposure of both coupler containing layers is from the side of said imaging element having the biaxially orinented sheet. This allows for traditional image processing equipment to be used. The imaging elements of this invention can be exposed via traditional optical methods using a negative, but they are preferably exposed by means of a collimated beam, to form a latent image, and then processed to form a visible image, preferably by other than heat treatment. A collimated beam is preferred as it allows for digital printing and simultaneous exposure of the imaging layer on the top and bottom side without significant internal light scatter. A preferred example of a collimated beam is a laser also known as light amplification by stimulated emission of radiation. The laser is preferred because this technology is used widely in a number of digital printing equipment types. Further, the laser provides sufficient energy to simultaneously expose the light sensitive silver halide coating on the top and bottom side of the display material of this invention without undesirable light scatter. Subsequent processing of the latent image into a visible image is preferably carried out in the known RA-4™ (Eastman Kodak Company) Process or other processing systems suitable for developing high chloride emulsions.

The following examples illustrate the practice of this invention. They are not intended to be exhaustive of all possible variations of the invention. Parts and percentages are by weight unless otherwise indicated.

EXAMPLES

Example 1

The following laminated photographic display material (invention) was prepared by solvent adhesive laminating the following sheet to the topside of a photographic grade polyester base:

Top Sheet (Emulsion Side)

A composite sheet consisting of 5 layers identified as L1, L2, L3, L4, and L5. L1 is the thin colored layer on the outside of the sheet to which the photosensitive silver halide layer was attached. L2 is the layer to which optical brightener and 6% $TiO_2$ was added. The optical brightener used was Hostalux Kans. manufactured by Ciba-Geigy. The rutile $TiO_2$ used was DuPont R104 (a 0.22 micrometer particle size $TiO_2$). Table 1 below lists the characteristics of the layers of the top biaxially oriented sheet used in this example.

TABLE 1

| Layer | Material | Thickness ($\mu$m) |
|---|---|---|
| L1 | Low Density Polyethylene + color concentrate | 0.75 |
| L2 | Polypropylene + $TiO_2$ + OB | 4.32 |
| L3 | Voided Polypropylene | 24.9 |
| L4 | Polypropylene | 4.32 |
| L5 | Polypropylene | 0.762 |
| L6 | Low Density Polyethylene | 11.4 |

Photographic Grade Polyester Base

A polyethylene terephthalate base 125 micrometers thick that was transparent and gelatin sub on both sides of the base. The top sheet used in this example was coextruded and biaxially oriented. The top sheet was solvent coated laminated to the polyester base using a thermoplastic polyester adhesive. The adhesive used was manufactured by Bostik and is sold under the tradename Vitel 3200B. The adhesive was dissolved in methyl ethyl ketone and coated onto a 125 micrometers thick polyester sheet that has been previously coated with a conductive tin oxide and gelatin layer. The adhesive was applied to the polyester sheet at a coverage of approximately 3.8 g/m$^2$, dried, and then conveyed into a pressure, heated roller nip together with a biaxially oriented polyolefin sheet as described in this example. The adhesion force between the two sheets was excellent.

The L3 layer for the biaxially oriented sheet is microvoided and further described in Table 2 where the refractive index and geometrical thickness is shown for measurements made along a single slice through the L3 layer; they do not imply continuous layers, a slice along another location would yield different but approximately the same thickness. The areas with a refractive index of 1.0 are voids that are filled with air and the remaining layers are polypropylene.

TABLE 2

| Sublayer of L3 | Refractive Index | Thickness, $\mu$m |
|---|---|---|
| 1 | 1.49 | 2.54 |
| 2 | 1 | 1.527 |
| 3 | 1.49 | 2.79 |
| 4 | 1 | 1.016 |
| 5 | 1.49 | 1.778 |
| 6 | 1 | 1.016 |
| 7 | 1.49 | 2.286 |
| 8 | 1 | 1.016 |
| 9 | 1.49 | 2.032 |
| 10 | 1 | 0.762 |
| 11 | 1.49 | 2.032 |
| 12 | 1 | 1.016 |
| 13 | 1.49 | 1.778 |
| 14 | 1 | 1.016 |
| 15 | 1.49 | 2.286 |

The bending stiffness of the polyester base and the laminated display material support was measured by using the Lorentzen and Wettre stiffness tester, Model 16D. The output from this instrument is force, in millinewtons, required to bend the cantilevered, unclasped end of a sample 20 mm long and 38.1 mm wide at an angle of 15 degrees from the unloaded position. In this test the stiffness in both the machine direction and cross direction of the polyester base was compared to the stiffness of the base laminated with the top biaxilly oriented sheet of this example. The results are presented in Table 3.

TABLE 3

| | Machine Direction Stiffness (millinewtons) | Cross Direction Stiffness (millinewtons) |
|---|---|---|
| Before Lamination | 55 | 41 |
| After Lamination | 89 | 73 |

The data above in Table 3 show the significant increase in stiffness of the polyester base after lamination with a biaxially oriented polymer sheet. This result is significant in that prior art materials, in order to provide the necessary stiffness, used polyester bases that were much thicker (between 150 and 256 micrometers) compared to the 125 micrometer polyester base used in this example. At equivalent stiffness, the significant increase in stiffness after lamination allows for a thinner polyester base to be used compared to prior art materials, thus reducing the cost of the reflection display support. Further, a reduction in reflection display material thickness allows for a reduction in material handling costs, as rolls of thinner material weigh less and are smaller in roll diameter.

The display material was processed without exposure to obtain a minimum density. The display support was measured for status A density using an X-Rite Model 310 photographic densitometer. Spectral transmission is calculated from the Status A density readings and is the ratio of the transmitted power to the incident power and is expressed as a percentage as follows: $T_{RGB}=10^{-D}*100$ where D is the average of the red, green, and blue Status A transmission density response. The display material were also measured for L*, a* and b* using a Spectrogard spectrophotometer, CIE system, using illuminant D6500. In the transmission mode, a qualitative assessment was made as to the amount of illuminating backlighting show through. A substantial amount of lamp show through would be considered undesirable, as the back illuminating light sources could interfere with the image quality. The comparison data for invention and control are listed in Table 4 below.

TABLE 4

| Measurement | Value |
|---|---|
| % Transmission | 42.3% |
| CIE D6500 L* | 58.00 |
| CIE D6500 a* | −0.65 |
| CIE D6500 b* | 2.76 |
| Illuminating Backlight Show Through | None |

The reflection/transmission display support coated on the top and bottom sides with the light sensitive silver halide coating format of this example exhibits all the properties needed for an photographic display material that can function as both a reflective and transmission display material. Further the photographic reflection/transmission display material of this example has many advantages over prior art photographic display materials. The non-voided layers have levels of $TiO_2$ and colorants adjusted to provide an improved minimum density position compared to prior art reflection display materials or prior art transmission display materials as the invention was able to overcome the native 10 yellowness of the processed emulsion layers (b* for the invention was 2.76 compared to a typical b* of 7.0 to 12.0 for prior art transmission materials). In the transmission mode, the illuminating backlights did not show through, indicating an acceptable transmission product.

The % transmission for the invention (42.3%) provides an acceptable reflection image and allows enough light through the support to be an acceptable transmission image. A display material that functions as both transmission materials and reflective materials has significant commercial value, as the quality of the display image is robust to lighting factors.

The following layer formulations were prepared by methods well known to the art. All material laydowns are expressed in terms of $g/m^2$.

| BL-1: Blue Sensitive Layer | |
|---|---|
| Gelatin | 1.184 |
| Blue Sensitive Silver | 0.280 |
| Y-1 | 0.452 |
| ST-1 | 0.078 |
| ST-2 | 0.026 |
| Diundecyl phthalate | 0.198 |
| BL-2: Blue Sensitive Layer | |
| Gelatin | 1.306 |
| Blue Sensitive Silver | 0.350 |
| Y-1 | 0.452 |
| ST-1 | 0.078 |
| ST-2 | 0.026 |
| Diundecyl phthalate | 0.198 |
| BL-3: Blue Sensitive Layer | |
| Gelatin | 1.629 |
| Blue Sensitive Silver | 0.322 |
| Y-2 | 0.484 |
| ST-3 | 0.255 |
| Tributyl citrate | 0.141 |
| Poly(N-tert-butylacrylamide) | 0.484 |
| SY-1: Enhancer Layer | |
| Gelatin | 0.323 |
| Y-1 | 0.194 |
| ST-1 | 0.033 |
| ST-2 | 0.011 |
| Diundecyl phthalate | 0.085 |
| IL-1: Interlayer | |
| Gelatin | 0.753 |
| 2,5-Di-tert-octyl hydroquinone | 0.066 |
| Dibutyl phthalate | 0.188 |
| Disodium 4,5 Dihydroxy-m-benzenedisulfonate | 0.065 |
| Irganox 1076 ™ | 0.010 |
| GL-1: Green Sensitive Layer | |
| Gelatin | 1.340 |
| Green Sensitive Silver | 0.104 |
| M-1 | 0.225 |
| Dibutyl phthalate | 0.080 |
| ST-4 | 0.061 |
| ST-5 | 0.171 |
| ST-6 | 0.571 |
| GL-2: Green Sensitive Layer | |
| Gelatin | 1.340 |
| Green Sensitive Silver | 0.130 |
| M-1 | 0.225 |
| Dibutyl phthalate | 0.080 |
| ST-4 | 0.061 |
| ST-5 | 0.171 |
| ST-6 | 0.571 |
| UV IL-1: UV Interlayer | |
| Gelatin | 0.712 |
| UV-1 | 0.030 |
| UV-2 | 0.172 |
| 2,5-Di-tert-octyl hydroquinone | 0.055 |
| Dibutyl phthalate | 0.034 |
| 1,4-Cyclohexylenedimethylene bis(2-ethylhexanoate) | 0.034 |
| RL-I Red Sensitive Layer | |
| Gelatin | 1.338 |
| Red Sensitive Silver | 0.211 |
| C-1 | 0.381 |

-continued

| | |
|---|---|
| Dibutyl phthalate | 0.373 |
| UV-2 | 0.246 |
| 2-(2-butoxyethoxy)ethyl acetate | 0.031 |
| 2,5-Di-tert-octyl hydroquinone | 0.003 |
| Potassium tolylthiosulfonate | 0.003 |
| Potassium tolylsulfinate | 0.0003 |
| RL-2 Red Sensitive Layer | |
| Gelatin | 1.338 |
| Red Sensitive Silver | 0.264 |
| C-1 | 0.381 |
| Dibutyl phthalate | 0.373 |
| UV-2 | 0.246 |
| 2-(2-butoxyethoxy)ethyl acetate | 0.031 |
| 2,5-Di-tert-octyl hydroquinone | 0.003 |
| Potassium tolylthiosulfonate | 0.003 |
| Potassium tolylsulfinate | 0.0003 |
| UV-1: UV Overcoat | |
| Gelatin | 0.537 |
| UV-1 | 0.023 |
| UV-2 | 0.130 |
| 2,5-Di-tert-octyl hydroquinone | 0.042 |
| Dibutyl phthalate | 0.025 |
| 1,4-Cyclohexylenedimethylene bis(2-ethylhexanoate) | 0.025 |
| TEL-1: Tone Enhancing Layer | |
| Gelatin | 0.537 |
| UV-1 | 0.023 |
| UV-2 | 0.130 |
| 2,5-Di-tert-octyl hydroquinone | 0.042 |
| Titanium Dioxide | 0.269 |
| Dibutyl phthalate | 0.025 |
| 1,4-Cyclohexylenedimethylene bis(2-ethylhexanoate) | 0.025 |
| TEL-2: Tone Enhancing Layer | |
| Gelatin | 0.537 |
| UV-I | 0.023 |
| UV-2 | 0.130 |
| 2,5-Di-tert-octyl hydroquinone | 0.042 |
| Titanium Dioxide | 0.538 |
| Dibutyl phthalate | 0.025 |
| 1,4-Cyclohexylenedirnethylene his(2-ethylhexanoate) | 0.025 |
| TEL-3: Tone Enhancing Layer | |
| Gelatin | 0.537 |
| 2,5-Di-tert-octyl hydroquinone | 0.042 |
| Titanium Dioxide | 0.538 |
| Dibutyl phthalatelrganox 1076 ™ | 0.120 |
| | 0.006 |
| SOC-1: SOC | |
| Gelatin | 1.076 |
| 2,5-Di-tert-octyl hydroquinone | 0.013 |
| Dibutyl phthalate | 0.039 |
| SF-1 | 0.009 |
| SF-2 Polystyrene Matte Beads (2.5 µm average diameter) | 0.004 |
| Dye-1 | 0.013 |
| Dye-2 | 0.011 |
| Dye-3 | 0.004 |
| | 0.009 |
| SOC-2: SOC | |
| Gelatin | 1.076 |
| 2,5-Di-tert-octyl hydroquinone | 0.013 |
| Dibutyl phthalate | 0.039 |
| SF-1 | 0.009 |
| SF-2 Polystyrene Matte Beads (2.5 µm average diameter) | 0.004 |
| | 0.125 |
| SOC-3: SOC | |
| Gelatin | 1.076 |
| 2,5-Di-tert-octyl hydroquinone | 0.013 |
| Dibutyl phthalate | 0.039 |
| SF-1 | 0.009 |
| SF-2 Polystyrene Matte Beads (2.5 µm average diameter) | 0.004 |
| Dye-4 | 0.125 |
| Dye-5 | 0.054 |
| | 0.108 |

-continued

| | |
|---|---|
| SOC-4: SOC | |
| Gelatin | 1.076 |
| 2,5-Di-tert-octyl hydroquinone | 0.013 |
| Dibutyl phthalate | 0.039 |
| SF-1 | 0.009 |
| SF-2 Polystyrene Matte Beads (2.5 µm average diameter) | 0.004 |
| Titanium Dioxide | 0.125 |
| | 1.076 |
| SOC-5: SOC | |
| Gelatin | 1.076 |
| 2,5-Di-tert-octyl hydroquinone | 0.013 |
| Dibutyl phthalate | 0.039 |
| SF-1 | 0.009 |
| SF-2 Polystyrene Matte Beads (2.5 µm average diameter) | 0.004 |
| Dye-4 | 0.125 |
| Dye-5 | 0.054 |
| | 0.108 |

Y-1

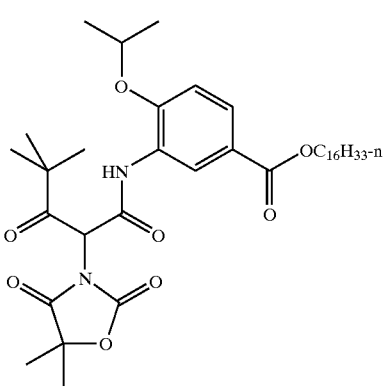

Y-2

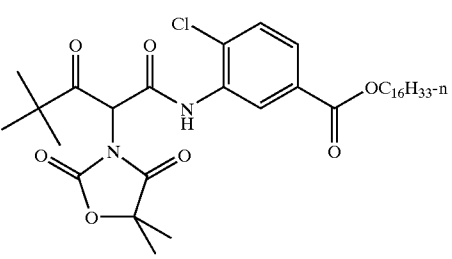

M-1

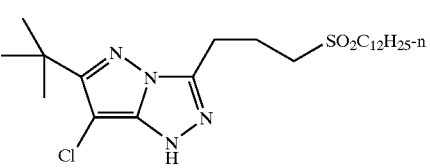

C-1

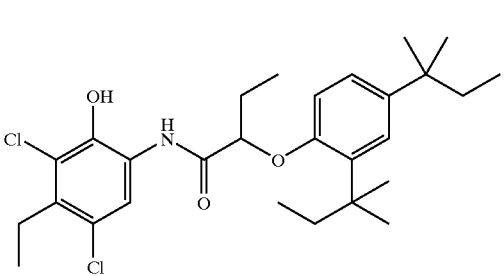

-continued

ST-1
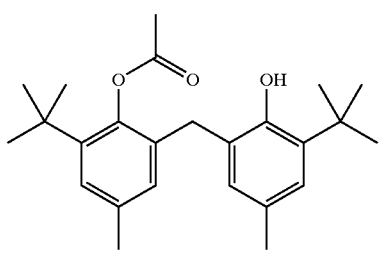

ST-2
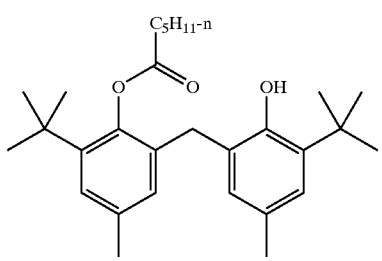

ST-3
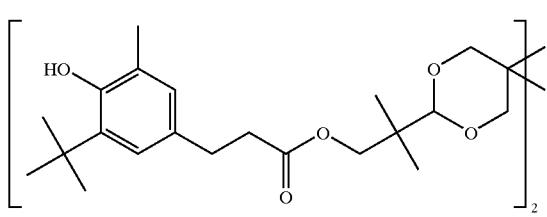

ST-4
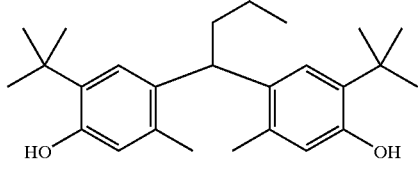

ST-5
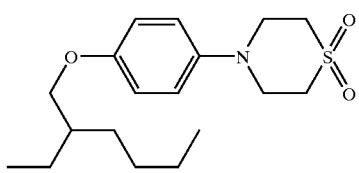

ST-6
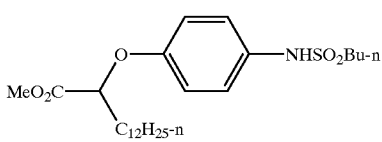

DYE-1
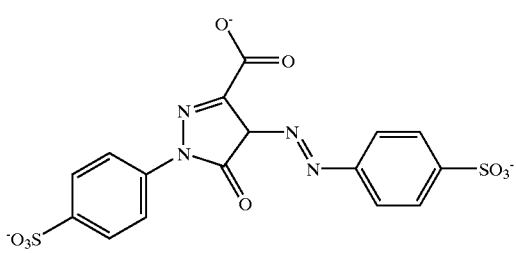

-continued

DYE-2
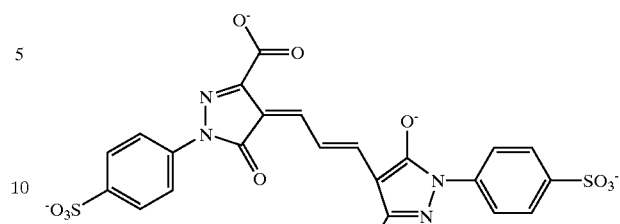

DYE-3
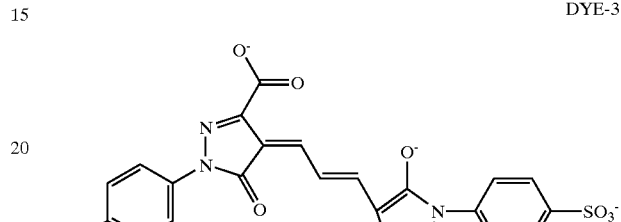

UV-1
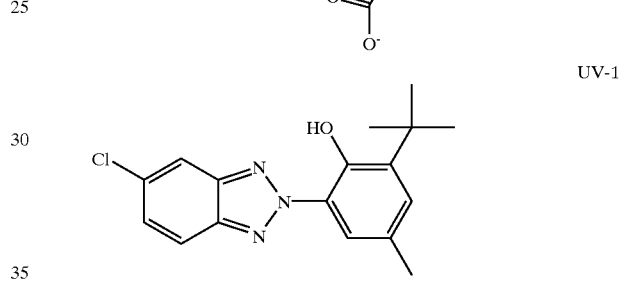

UV-2
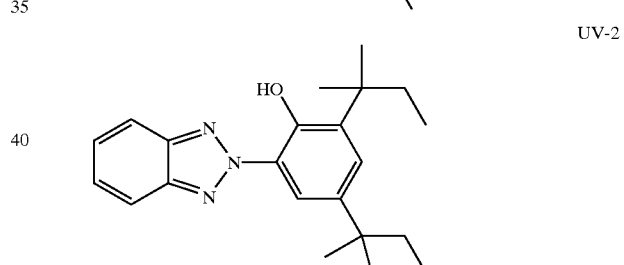

SF-1
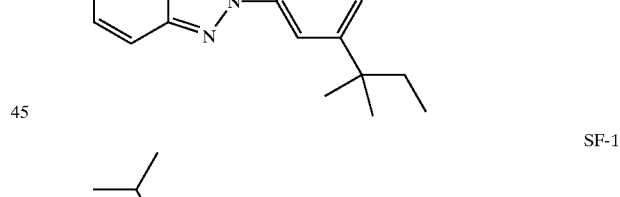

SF-2
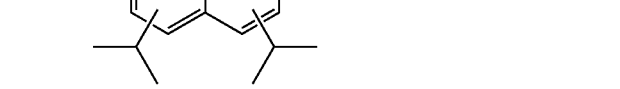
CF•(CF$_2$)$_7$•SO$_3$Na

The samples were given a separation exposure using a laser sensitometer and processed using a standard RA-4 process (developer time 45 sec). In the table below, Shoulder 3 and Shoulder 6 are the densities measured relative to 0.3 and 0.6 log E slow of the speed point. The speed point is defined as the speed at a density of 0.8 above Dmin, wherein Dmin is the minimum density obtained after processing of the unexposed photographic element.

Example 2

The example used in this part was prepared the same as Example 1 expect that a blend of adhesives was used in placed of the Bostik Vitel 3200B.

The adhesive used in the second example consists of the following:

30% (by weight) KRATON D1107P
30% REGALREZ 1085
40% REGALREZ 1018

The KRATON resin is a styrene-isoprene-styrene (SIS) block copolymer from Shell Chemical Co. It is a linear thermoplastic rubber.

The REGALREZ materials are both hydrogenated hydrocarbon resins from Hercules, Inc. They differ in softening point and molecular weight and function as "tackifying resins" for the rubber. The adhesive was prepared at 25% solids in a blend of 90% (by weight) toluene and 10% methyl alcohol. It was coated at a dry coverage of 3.8 g/m$^2$. The adhesive was dried to remove most of the residual solvent, and the biaxially oriented sheet as described in Example 1 was heat and pressure laminated to the adhesive coated polyester sheet. The laminated sheet was then coated with the silver halide photographic emulsion as described above.

Control

The control sample used in this invention was identical to Example 1 except the biaxially oriented polypropylene sheet as adhered to the polyester sheet using a melt extrudable polyolefin polymer of a 10 melt index low density (0.917 g/cc) polyethylene. The polyethylene was heated to approximately 315 ° C. and extruded from a T-slot die onto the polyester sheet. The coverage of the melt polymer was 24 g/m$^2$. The control sample was also emulsion coated, processed, and developed as described above.

The examples and control were then evaluated for adhesion, slit edge quality, and cracking.

TABLE 5

| Example | Adhesion | Cracking | Slit Edge Quality |
|---------|----------|----------|-------------------|
| Control | 4 | 4 | 4 |
| 1 | 5 | 2 | 5 |
| 2 | 3 | 2 | 3 |

The adhesion of the samples in Table 5 were rated on a 1–5 scale with 1 being no adhesion, 2 being very slight adhesion but easy to separate the sheets, 3 being able to remove the biaxially oriented polypropylene sheet (BOPP) from the polyester sheet without breaking the BOPP sheet, 4 being a strong bond between the sheets, but with some work the sheet can be separated with it occasionally breaking, and 5 being excellent adhesive in which the BOPP sheet break.

Slit edge quality was determined by viewing the edges of a slit sample under a microscope using 10× magnification. Observation were made on how clean the cut was. If a sample had a ragged uneven cut or strings of material hanging from the adhesive layer, they were qualitatively rating at the 1 scale, and the less uneven cuts with less evidence of stings hanging from the adhesive layer were rated higher in the 1–5 scale. As can be seen from Table 5, sample 1 which comprises the more preferred adhesive had better slitting than the other adhesive and performance slightly better than the control which was a polyethylene. In addition, the samples prepared above were subjected to a mandrel cracking test. The cracking test used samples without silver halide emulsion. This test was run to look for potential damage to the imaging element if wound in a tight tube or if the element buckled under its own weight during handling. Samples were wrapped around a pipe (mandrel) with a diameter of 15 mm with the biaxially oriented sheet with voids facing towards the pipe. That is, the voided layer in the biaxially oriented sheet were put into compression and held for one minute. The samples were then unwrapped and inspected for cracking. The samples were rated on a 1–5 scale with 1=no cracking, 2=no cracking/very slight evidence of cracking, 3=slight cracking, 4=slight/moderate cracking, and 5=moderate cracking. As the data from Table 5 indicate, the samples with the thermoplastic adhesive performed better than the melt extruded sample showing the importance of these materials.

The invention has been described in detail with particular reference to certain preferred embodiments thereof, but it will be understood that variations and modifications can be effected within the spirit and scope of the invention.

What is claimed is:

1. An imaging member comprising at least two polymer sheets joined by solvent based thermoplastic adhesive, wherein said adhesive was applied to at least one of said at least two polymer sheets at a temperature between 15 and 50° C. and wherein said thermoplastic adhesive contains an antistatic agent.

2. The imaging member of claim 1 wherein said thermoplastic adhesive is selected from the group consisting of acrylic, polyamide, polyester and polyurethane resins or tri-block copolymers having an elastomeric block in the center and a thermoplastic block on each end being further modified with hydrogenated hydrocarbon resins.

3. The imaging member of claim 2 wherein said thermoplastic adhesive comprises polyester and said polyester resin consists of a thermoplastic, high molecular weight, aromatic, linear saturated polyester.

4. The imaging member of claim 1 wherein said thermoplastic adhesive may be cross-linked using amino resins, epoxy resins, aziridines, or isocyanate compounds.

5. The imaging element of claim 1 wherein said thermoplastic adhesive further comprises an aromatic hydrocarbons, oxygenated solvents, halogenated hydrocarbons and nitroparaffins.

6. The imaging member of claim 1 wherein said thermoplastic adhesive comprises polyester resin.

7. The imaging member of claim 3 wherein said polyester adhesive contains an antistatic agent selected from the group consisting of conductive metal oxides, carbon particles, and synthetic smectite clay, or multilayered with an inherently conductive polymer.

8. The imaging member of claim 7 wherein said antistatic-modified thermoplastic adhesive has an electrical resistance less than $10^{13}$ log ohms/square.

9. The imaging member of claim 1 wherein said thermoplastic adhesive contains an ultraviolet light absorber or stabilizer selected from the group consisting of: benzophenones and diphenyl acrylates.

10. The imaging member of claim 1 wherein said thermoplastic adhesive is present in said imaging member in an amount between 0.06 g/m$^2$ to 7.4 g/m$^2$ or 0.06 to 7.0 $\mu$m in dry thickness.

11. The imaging member of claim 1 wherein thermoplastic adhesive has a peel strength of greater than 170 g/5 cm.

12. The imaging member of claim 1 wherein said thermoplastic adhesive has an optical transmissivity of at least 80%.

13. The imaging member of claim 1 wherein said thermoplastic adhesive remains essentially colorless during its useful life.

14. The imaging member of claim 1 wherein said polymer sheets comprise any combination of polyolefins, polyester, polyamides, and polycarbonates.

15. The imaging member of claim 1 wherein said polymer sheets comprise a sheet of polyolefin polymer and a sheet of polyester polymer.

16. The imaging member of claim 1 wherein said at least one polymer sheet further comprises an antistat.

17. The imaging member of claim 1 wherein said imaging member has a spectral transmission greater than 38%.

18. An imaging member comprising at least two polymer sheets joined by solvent based thermoplastic adhesive, wherein said adhesive was applied to at least one of said at least two polymer sheets at a temperature between 15 and 50° C. and wherein said thermoplastic adhesive contains an ultraviolet light absorber or stabilizer selected from the group consisting of: benzophenones and diphenyl acrylates.

19. The imaging member of claim 18 wherein said thermoplastic adhesive is selected from the group consisting of acrylic, polyamide, polyester and polyurethane resins or tri-block copolymers having an elastomeric block in the center and a thermoplastic block on each end being further modified with hydrogenated hydrocarbon resins.

20. The imaging member of claim 19 wherein said thermoplastic adhesive comprises polyester and said polyester resin consists of a thermoplastic, high molecular weight, aromatic, linear saturated polyester.

21. The imaging member of claim 18 wherein said thermoplastic adhesive may be cross-linked using amino resins, epoxy resins, aziridines, or isocyanate compounds.

22. The imaging element of claim 18 wherein said thermoplastic adhesive further comprises an aromatic hydrocarbons, oxygenated solvents, halogenated hydrocarbons and nitroparaffins.

23. The imaging member of claim 20 wherein said thermoplastic adhesive contains an antistatic agent.

24. The imaging member of claim 20 wherein said polyester adhesive contains an antistatic agent selected from the group consisting of conductive metal oxides, carbon particles, and synthetic smectite clay, or multilayered with an inherently conductive polymer.

25. The imaging member of claim 24 wherein said antistatic-modified thermoplastic adhesive has an electrical resistance less than $10^{13}$ log ohms/square.

26. The imaging member of claim 18 wherein said thermoplastic adhesive is present in said imaging member in an amount between 0.06 g/m$^2$ to 7.4 g/m$^2$ or 0.06 to 7.0 $\mu$m in dry thickness.

27. The imaging member of claim 18 wherein thermoplastic adhesive has a peel strength of greater than 170 g/5 cm.

28. The imaging member of claim 18 wherein said thermoplastic adhesive has an optical transmissivity of at least 80%.

29. The imaging member of claim 18 wherein said polymer sheets comprise a sheet of polyolefin polymer and a sheet of polyester polymer.

30. The imaging member of claim 18 wherein said imaging member has a spectral transmission greater than 38%.

31. The imaging member of claim 18 wherein said imaging member comprises at least one image layer.

32. The imaging member of claim 18 wherein said imaging member comprises at least one image layer on the top and one image layer on the bottom.

33. The imaging member of claim 32 wherein said imaging member further comprises a tone enhancing layer and an antihalation layer.

34. An imaging member comprising at least two polymer sheets joined by solvent based thermoplastic adhesive, wherein said adhesive was applied to at least one of said at least two polymer sheets at a temperature between 15 and 50° C., wherein said imaging member comprises a least one image layer on the top and one image layer on the bottom, and wherein said imaging member further comprises a tone enhancing layer and an antihalation layer.

35. The imaging member of claim 34 wherein said thermoplastic adhesive is selected from the group consisting of acrylic, polyamide, polyester and polyurethane resins or tri-block copolymers having an elastomeric block in the center and a thermoplastic block on each end being further modified with hydrogenated hydrocarbon resins.

36. The imaging member of claim 34 wherein said thermoplastic adhesive comprises a thermoplastic, high molecular weight, aromatic, linear saturated polyester.

37. The imaging member of claim 1 wherein said thermoplastic adhesive may be cross-linked using amino resins, epoxy resins, aziridines, or isocyanate compounds.

38. The imaging element of claim 34 wherein said thermoplastic adhesive further comprises an aromatic hydrocarbons, oxygenated solvents, halogenated hydrocarbons and nitroparaffins.

39. The imaging member of claim 34 wherein said thermoplastic adhesive comprises polyester resin and contains an antistatic agent.

40. The imaging member of claim 36 wherein said polyester adhesive contains an antistatic agent selected from the group consisting of conductive metal oxides, carbon particles, and synthetic smectite clay, or multilayered with an inherently conductive polymer.

41. The imaging member of claim 40 wherein said antistatic-modified thermoplastic adhesive has an electrical resistance less than $10^{13}$ log ohms/square.

42. The imaging member of claim 40 wherein said thermoplastic adhesive contains an ultraviolet light absorber or stabilizer selected from the group consisting of: benzophenones and diphenyl acrylates.

43. The imaging member of claim 34 wherein said thermoplastic adhesive is present in said imaging member in an amount between 0.06 g/m$^2$ to 7.4 g/m$^2$ or 0.06 to 7.0 $\mu$m in dry thickness.

44. The imaging member of claim 34 wherein thermoplastic adhesive has a peel strength of greater than 170 g/5 cm.

45. The imaging member of claim 34 wherein said thermoplastic adhesive has an optical transmissivity of at least 80%.

46. The imaging member of claim 34 wherein said thermoplastic adhesive remains essentially colorless during its useful life.

47. The imaging member of claim 34 wherein said polymer sheets comprise a sheet of polyolefin polymer and a sheet of polyester polymer.

48. The imaging member of claim 34 wherein said imaging member has a spectral transmission greater than 38%.

49. The imaging member of claim 34 wherein said imaging member comprises at least one image layer.

50. The imaging member of claim 1 wherein said imaging member comprises at least one image layer.

51. The imaging member of claim 1 wherein said imaging member comprises at one image layer on the top and one image on the bottom.

52. The imaging member of claim 51 wherein said imaging member further comprises a tone enhancing layer and an antihalation layer.

* * * * *